United States Patent
Okamoto

(10) Patent No.: US 8,247,122 B2
(45) Date of Patent: Aug. 21, 2012

(54) DEVICE AND METHOD FOR CONTROLLING FUEL CELL SYSTEM WITH VIBRATION AMPLITUDE DETECTION

(75) Inventor: Masaru Okamoto, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 814 days.

(21) Appl. No.: 10/556,898

(22) PCT Filed: Jul. 8, 2004

(86) PCT No.: PCT/JP2004/010079
§ 371 (c)(1),
(2), (4) Date: Nov. 15, 2005

(87) PCT Pub. No.: WO2005/011038
PCT Pub. Date: Feb. 3, 2005

(65) Prior Publication Data
US 2007/0026273 A1    Feb. 1, 2007

(30) Foreign Application Priority Data

Jul. 25, 2003   (JP) ................................. 2003-279731
Sep. 17, 2003   (JP) ................................. 2003-324491

(51) Int. Cl.
*H01M 8/04* (2006.01)

(52) U.S. Cl. ........ 429/430; 429/428; 429/431; 429/432; 429/443

(58) Field of Classification Search ............... 429/19, 429/22
See application file for complete search history.

(56) References Cited

U.S. PATENT DOCUMENTS

| | | | |
|---|---|---|---|
| 3,753,780 A | 8/1973 | Fetterman | |
| 3,850,695 A | 11/1974 | Keller et al. | |
| 4,741,978 A | 5/1988 | Takabayashi | |
| 2002/0051899 A1 | 5/2002 | Keskula et al. | |

FOREIGN PATENT DOCUMENTS

| | | |
|---|---|---|
| EP | 0 993 060 A2 | 4/2000 |
| EP | 0993060 A2 * | 12/2000 |
| GB | 1304092 | 1/1973 |
| JP | 60-91569 A | 5/1985 |
| JP | 64-89158 A | 4/1989 |
| JP | 04-174975 A | 6/1992 |
| JP | 08-007911 A | 1/1996 |
| JP | 09-17440 A | 1/1997 |
| JP | 2000-208161 A | 7/2000 |
| JP | 2002-164068 A | 6/2002 |
| JP | 2002-184443 A | 6/2002 |
| JP | 2002-260704 A | 9/2002 |
| JP | 2002-289235 A | 10/2002 |

* cited by examiner

*Primary Examiner* — Barbara Gilliam
*Assistant Examiner* — Kwang Han
(74) *Attorney, Agent, or Firm* — Foley & Lardner LLP

(57) ABSTRACT

A fuel cell system has a fuel cell generating power using a fuel gas and an oxidizing agent gas serving as materials of the system and a material supply section supplying the materials to the fuel cell. The power generated by the fuel cell is extracted to a load. A device for controlling the fuel cell system has: a material flow calculation section calculating a material flow supplied to the fuel cell so as to cause the fuel cell to generate the power of a required power generation amount; a material reduction limit detection section calculating a limit for reducing the material flow, based on a power generation state of the fuel cell; and a material flow change section controlling the material supply section so as to change the material flow calculated by the material flow calculation section to the limit calculated by the material reduction limit detection section.

16 Claims, 16 Drawing Sheets

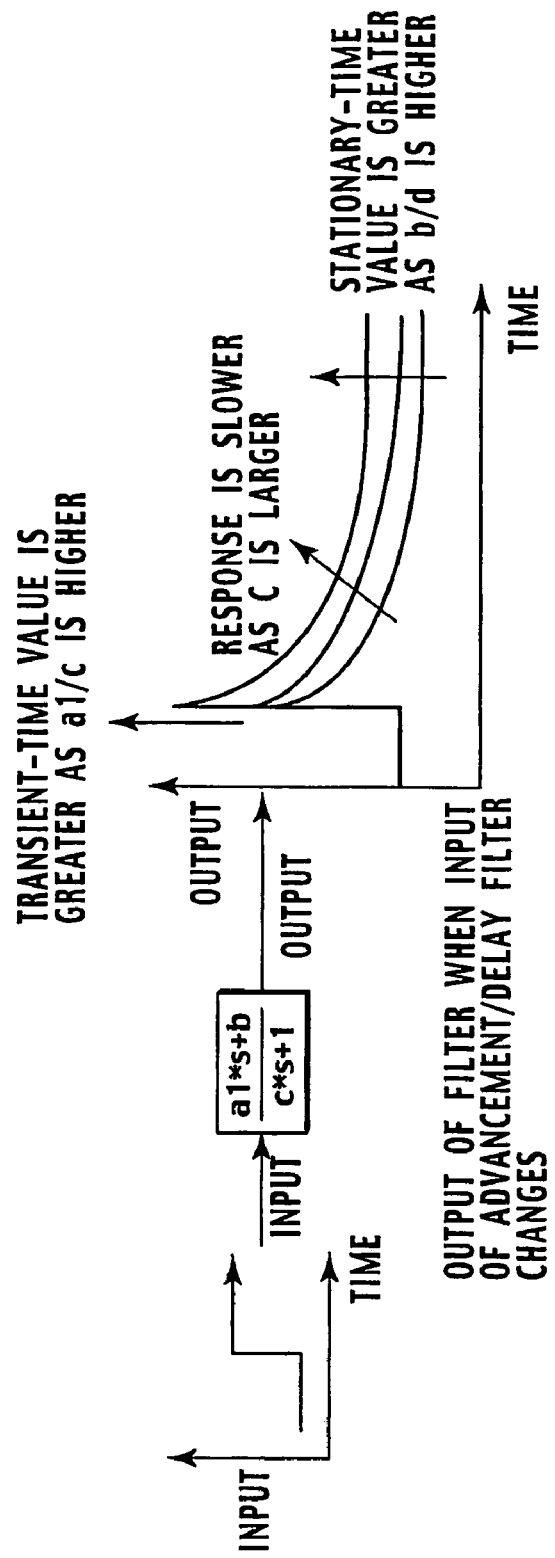

DEVICE AND METHOD FOR CONTROLLING FUEL CELL SYSTEM WITH VIBRATION AMPLITUDE DETECTION

TECHNICAL FIELD

The present invention relates to a fuel cell system which supplies an oxidant gas and a fuel gas to fuel cells, and which thereby causes the fuel cells to generate power, and relates to a device and a method for controlling the fuel cell system.

BACKGROUND ART

Recently, a control device for a fuel cell system which supplies a hydrogen gas to a hydrogen electrode of a fuel cell stack and the air to an air electrode of the fuel cell stack, which electrochemically reacts oxygen in the air at air the electrode with hydrogen at the hydrogen electrode, and which thereby causes the fuel cell stack to generate power has been studied. Particularly, development of a control device for an automotive fuel cell system which supplies the power generated by the fuel cell stack to a driving motor that generates a vehicle running torque is underway.

As one example of the automotive fuel cell stack, a polymer electrolyte fuel cell (PEFC) stack is known. The PEFC stack is configured to provide a solid polymer membrane between a hydrogen electrode and an air electrode, and to enable the solid polymer membrane to function as a hydrogen ion conductor. A hydrogen gas is decomposed to hydrogen ions and electrons in the hydrogen electrode, whereas an oxygen gas, hydrogen ions, and electrons are chemically bonded together to generate water in the air electrode. At this time, the hydrogen ions travel from the hydrogen electrode to the air electrode via the solid polymer membrane. In order so that the hydrogen ions travel via the solid polymer membrane, the solid polymer membrane needs to contain water vapor. Due to this, the fuel cell system control device needs to humidify the solid polymer membrane, and keep the solid polymer membrane humid. To this end, a technique for humidifying the hydrogen gas to be supplied to the fuel cell stack using a humidifier, and for supplying the resultant hydrogen gas to the hydrogen electrode is proposed.

As en effective technique for humidifying the solid polymer membrane, a hydrogen cycling technique for recirculating the hydrogen gas which is not used by the fuel cell stack but discharged therefrom to the fuel cell stack so as to be recycled by the fuel cell stack is known. In the fuel cell system which adopts the hydrogen cycling, the hydrogen gas is supplied to the hydrogen electrode by an amount slightly larger than a required hydrogen amount to generate power consumed by a load connected to an outside of the fuel cell stack, unused hydrogen gas is discharged from an outlet of the hydrogen electrode, and this exhaust hydrogen gas (hereinafter, "cyclic hydrogen") is returned again to an inlet port of the hydrogen electrode. At this moment, the cyclic hydrogen discharged from the fuel cell stack contains much water vapor. Therefore, the cyclic hydrogen is mixed with dry hydrogen supplied from a hydrogen tank, a hydrogen mixture is supplied to the hydrogen electrode, and the hydrogen to be supplied to the hydrogen electrode is thereby humidified.

As can be seen, not only a hydrogen flow necessary for power generation but also an excessive hydrogen flow for humidifying the solid polymer membrane pass through the hydrogen electrode of the fuel cell stack. That is, by supplying a hydrogen flow more than the hydrogen flow necessary for power generation to the hydrogen electrode, all cells that constitute the fuel cell stack are enabled to efficiently generate power.

On the other hand, if only a hydrogen flow corresponding to a required power generation amount is supplied to the hydrogen electrode, then there is a probability that hydrogen does not efficiently reach the cells near the outlet port of the hydrogen electrode, and that the power generation efficiency of the fuel cell stack is deteriorated. Similarly, not an oxygen flow corresponding to the required power generation amount but an oxygen flow slightly larger than the oxygen flow corresponding to the required power generation amount is supplied to the air electrode. Namely, a material stoichiometric ratio that indicates a ratio of a consumed gas amount to a supplied gas amount is "1" when only the hydrogen flow or the oxygen flow corresponding to the required power generation amount is supplied. From viewpoints of humidification and power generation efficiency, the material stoichiometric ratio is normally set higher than "1".

Nevertheless, even if the material stoichiometric ratio is optimum in a system design phase, it is not always optimum for an operating state of the fuel cell stack. Due to this, the material stoichiometric ratio is set higher so as to somewhat include a margin ratio, thereby setting supply amounts of hydrogen and oxygen to the fuel cell stack to be larger. As a result, materials such as hydrogen are disadvantageously wasted.

To eliminate waste of the materials, therefore, the material flow is reduced so that the material stoichiometric ratio is closer to "1". If so, however, the supply amounts of hydrogen and oxygen need to be changed to be sensitive to a change in the operating state (a temperature, a humidity, a material distribution, and the like) of the fuel cell stack, thereby losing robustness. As a result, even with a slight change in the operating state, generated voltage is reduced to a lower limit or lower.

To prevent this disadvantage, fuel cell systems intended to appropriately control the material flow are disclosed in Japanese Patent Application Laid-Open Publication No. 2002-289235, No. 2000-208161, and No. 2002-164068. Each of the fuel cell systems disclosed therein controls the material flow so that a change in a cell voltage of a fuel cell stack falls within an allowable range, controls the material flow so that a generated voltage by the fuel cell stack is equal to or higher than a lower limit, and increases the material flow when the generated voltage of the fuel cell stack falls.

DISCLOSURE OF INVENTION

However, each system detects a changing range of the cell voltage of the fuel cell stack, so that the system is incapable of measuring a reduction in the overall generated voltage of the fuel cell stack for the following reason. Since a voltage to be supplied to a load is supplied as an average voltage, changing ranges of the generated voltages of the respective cells cannot be individually measured. As a result, the system is disadvantageously incapable of detecting that the average generated voltage falls even if the irregularity of the cell voltage of each cell is within the allowable range, or detecting that the irregularity of the cell voltage of each cell increases even if the average generated voltage is equal to or higher than the lower limit.

Furthermore, to reduce materials as much as possible and enable the fuel cell stack to generate power, a control device for each of the fuel cell systems needs to accurately grasp a reduction width limit to each material. Besides, when controlling the supply amount of each material to be equal to a target amount, the fuel cell systems need to calculate an optimum control amount so as to prevent the supply amount from being excessively controlled to exceed the target amount, or from falling short of the target amount.

A first aspect of the present invention provides a device and a method for controlling a fuel cell system. The fuel cell system has a fuel cell generating power using a fuel gas and an oxidizing agent gas serving as materials of the fuel cell system and a material supply section supplying the materials to the fuel cell. The power generated by the fuel cell is extracted to a load. The device for controlling the fuel cell system has: a material flow calculation section calculating a material flow supplied to the fuel cell so as to cause the fuel cell to generate the power of a required power generation amount; a material reduction limit detection section calculating a limit for reducing the material flow supplied to the fuel cell, based on a power generation state of the fuel cell; and a material flow change section controlling the material supply section so as to change the material flow calculated by the material flow calculation section to the limit calculated by the material reduction limit detection section. The method for controlling the fuel cell system has: calculating a material flow supplied to the fuel cell so as to cause the fuel cell to generate the power of a required power generation amount; calculating a limit for reducing the material flow supplied to the fuel cell, based on a power generation state of the fuel cell; and controlling the material supply section so as to change the material flow to the limit.

A second aspect of the present invention provides a fuel cell system having: a fuel cell stack configured to generate power by causing hydrogen and oxygen to electrochemically react with each other; a fuel gas supply device configured to supply a fuel gas that contains the hydrogen, to the fuel cell stack; an oxidizing agent gas supply device configured to supply an oxidizing agent gas that contains the oxygen, to the fuel cell stack; a voltage detection section configured to detect a voltage generated by the fuel cell stack; an oxygen concentration transient reduction section configured to reduce transiently an oxygen concentration in a cathode electrode of the fuel cell stack; a voltage variation detection section configured to detect a voltage variation when the oxygen concentration is transiently reduced by the oxygen concentration transient reduction section; and a voltage stabilization maintenance determination section configured to determine whether a present oxygen utilization ratio is appropriate for maintaining the voltage of the fuel cell stack stable, based on an output of the voltage variation detection section.

Other and further features, advantages, and benefits of the present invention will become more apparent from the following description taken in conjunction with the following drawings.

BRIEF DESCRIPTION OF DRAWINGS

FIG. 15A is a graph showing an output of an advancement/delay compensation filter when a definition equation;

FIG. 15B is a graph showing a step function of the advancement/delay compensation filter are input to the filter;

BEST MODE FOR CARRYING OUT THE INVENTION

Hereinafter, a fuel cell system and a fuel cell system control device of each of various embodiments according to the present invention are described principally with reference to the accompanying drawings FIGS. 1 to 21.

(First Embodiment)

Figure 1:
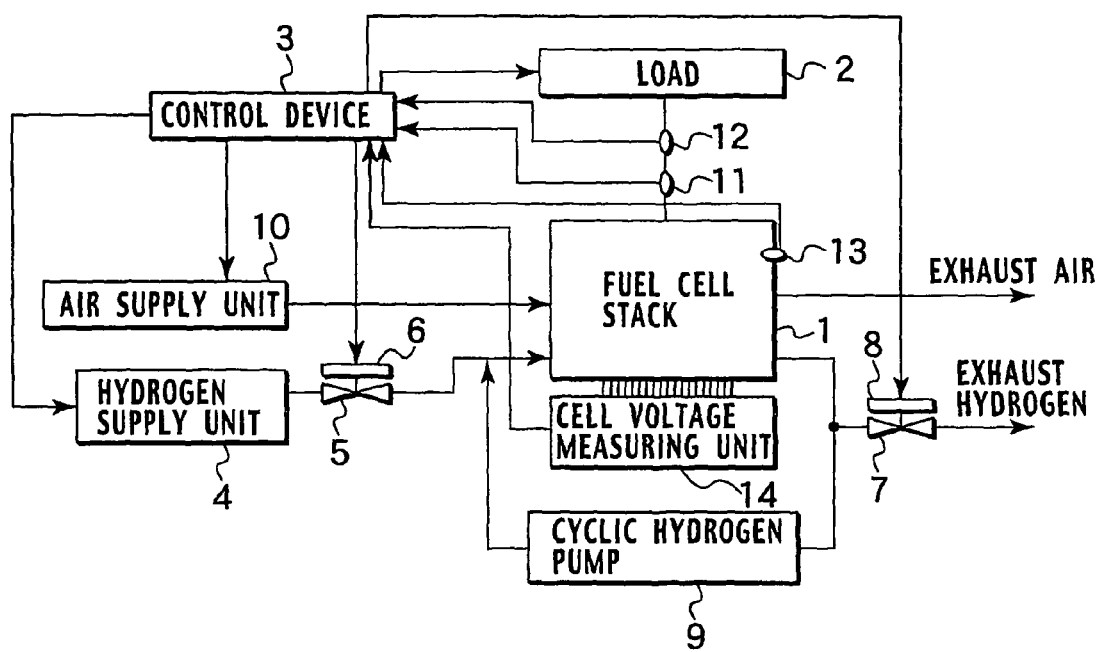
FIG. 1 is a block diagram showing a fuel cell system including a control device according to a first embodiment of the present invention.

A fuel cell system control device according to a first embodiment of the present invention is applied to a fuel cell system shown in FIG. 1, for example.

[CONFIGURATION OF FUEL CELL SYSTEM]

The fuel cell system includes a fuel cell stack 1 which is supplied with a fuel gas which contains a large amount of hydrogen and an oxidizing agent gas which contains oxygen, and which generates power. The fuel cell stack 1 includes a plurality of stacked cell structures, and constitutes a main power supply of the fuel cell system. Each cell structure includes a fuel cell structure and separators between which the fuel cell structure is held. The fuel cell structure includes a solid polymer electrolyte membrane (PEM) as well as a cathode electrode and an anode electrode opposed to each other across the solid PEM. The oxidizing agent gas is supplied to the cathode electrode, and the fuel gas is supplied to the anode electrode.

The fuel cell stack 1 generates power by the following chemical reaction. In the anode electrode, electrons are emitted from hydrogen contained in the fuel gas and ionized to generate hydrogen ions ($H^+$), which hydrogen ions pass through the PEM and reach the cathode electrode. In the cathode electrode, the hydrogen ions are bonded with oxygen contained in the oxidizing agent gas to thereby generate water ($H_2O$).

The fuel cell system shown in FIG. 1 includes a control device 3 which controls supply amounts of materials to the fuel cell stack 1 to thereby control power generation of the fuel cell stack 1, and which controls an operation of a load 2 driven by a generated power from the fuel cell stack 1. The "materials" include herein an oxidizing agent gas and a fuel gas. The control device 3 includes a storage section such as a read only memory (ROM) or the like, which is not shown, and stores a fuel cell control program which describes a series of processing procedures for activating the fuel cell system, and for supplying power to the load 2. The control device 3 reads signals from various sensors, to be described later, executes the fuel cell control program using a central processing unit (CPU) or the like, which is not shown, issues commands to respective constituent sections, and thereby controls the respective sections. If the fuel cell system is installed in a vehicle, the load 2 is, for example, a driving motor which generates a driving torque of the vehicle by the power generated by the fuel cell stack 1.

The fuel cell system shown in FIG. 1 includes material supply systems which supply materials to the fuel cell stack 1 so that the fuel cell stack 1 generates power. Specifically, the fuel cell system includes a hydrogen supply system for supplying hydrogen to the fuel cell stack 1 and an air supply system for supplying oxygen to the fuel cell stack 1. A pure water humidification system, not shown, for humidifying the hydrogen and the air to be supplied to the fuel cell stack 1 using pure water is connected to the hydrogen supply system and the air supply system.

The hydrogen supply system includes a hydrogen supply path connected to the fuel cell stack 1, a hydrogen supply device 4 arranged on the hydrogen supply path, a hydrogen supply valve 5, and a hydrogen supply actuator 6. The hydrogen supply device 4 includes a hydrogen flow control valve which regulates a hydrogen flow supplied to the fuel cell stack 1. The hydrogen supply system also includes a purge valve 7 and a purge actuator 8 which are arranged on a hydrogen discharge path connected to a hydrogen outlet of the fuel cell stack 1, and a cyclic hydrogen pump 9 arranged on a hydrogen circulation path connected to a hydrogen inlet of the fuel cell stack 1.

The control device 3 controls an opening of the hydrogen flow control valve of the hydrogen supply device 4 in accordance with a power generation amount required for the fuel cell stack 1, and controls the hydrogen actuator 6, thereby opening the hydrogen supply valve 5. The control device 3 further controls a number of revolutions of the cyclic hydrogen pump 9 to circulate the hydrogen discharged from the fuel cell stack 1 to the fuel cell stack 1. For example, to discharge gas in a hydrogen electrode so as to eliminate water vapor, impurities, and the like generated in the fuel cell stack 1, the control device 3 controls the purge actuator 8 to open the purge valve 7.

The hydrogen supply system mixes the hydrogen from the hydrogen supply device 4 with the cyclic hydrogen from the fuel cell stack 1, supplies a hydrogen mixture to the fuel cell stack 1, and thereby recycles the hydrogen discharged from the fuel cell stack 1. Since the cyclic hydrogen is supplied to and discharged from the fuel cell stack 1 while being humidified, the cyclic hydrogen contains much water vapor. Therefore, if the cyclic hydrogen is mixed with the hydrogen from the hydrogen supply device 4, then the humidified hydrogen is supplied to the fuel cell stack 1, and the solid PEM of the fuel cell stack is humidified.

The air supply system includes an air supply path connected to the fuel cell stack 1, an air supply device 10 arranged on the air supply path, and an air discharge path connected to an air discharge outlet of the fuel cell stack 1. The air supply device 10 is, for example, a compressor the number of revolutions of which is controlled by a control signal from the control device 3.

The control device 3 controls the number of revolutions of the compressor that constitutes the air supply device 10 in accordance with the power generation amount required for the fuel cell stack 1.

The load 2 which consumes generated power is connected to the fuel cell stack 1. If the load 2 is, for example, the driving motor, then the load 2 includes an inverter which converts a DC power from the fuel cell stack 1 into a desired electric power, and the generated power is supplied to the driving motor through the inverter. In supplying the generated power to the driving motor, the control device 3 sets power to be converted by the inverter, and controls the inverter to extract the generated power from the fuel cell stack 1.

The control device 3 includes a voltage sensor 11 and a current sensor 12 arranged on a power supply line that connects the fuel cell stack 1 to the load 2. The voltage sensor 11 and the current sensor 12 measure a voltage and a current on the power supply line, respectively. The measured voltage and current are supplied, as sensor signals, to the control device 3. The control device 3 reads the sensor signals and controls an operation of the inverter.

The fuel cell system includes a temperature sensor 13 which detects a temperature of the fuel cell stack 1, and a cell voltage measurement device 14 which detects a cell voltage of each cell that constitutes the fuel cell stack 1. When the materials are supplied to the fuel cell stack 1, the control device 3 reads sensor signals from the temperature sensor 13 and the cell voltage measurement device 14, and carries out a material flow control processing for controlling a hydrogen amount and an air amount.

[MATERIAL FLOW CONTROL PROCESSING]

Figure 2:
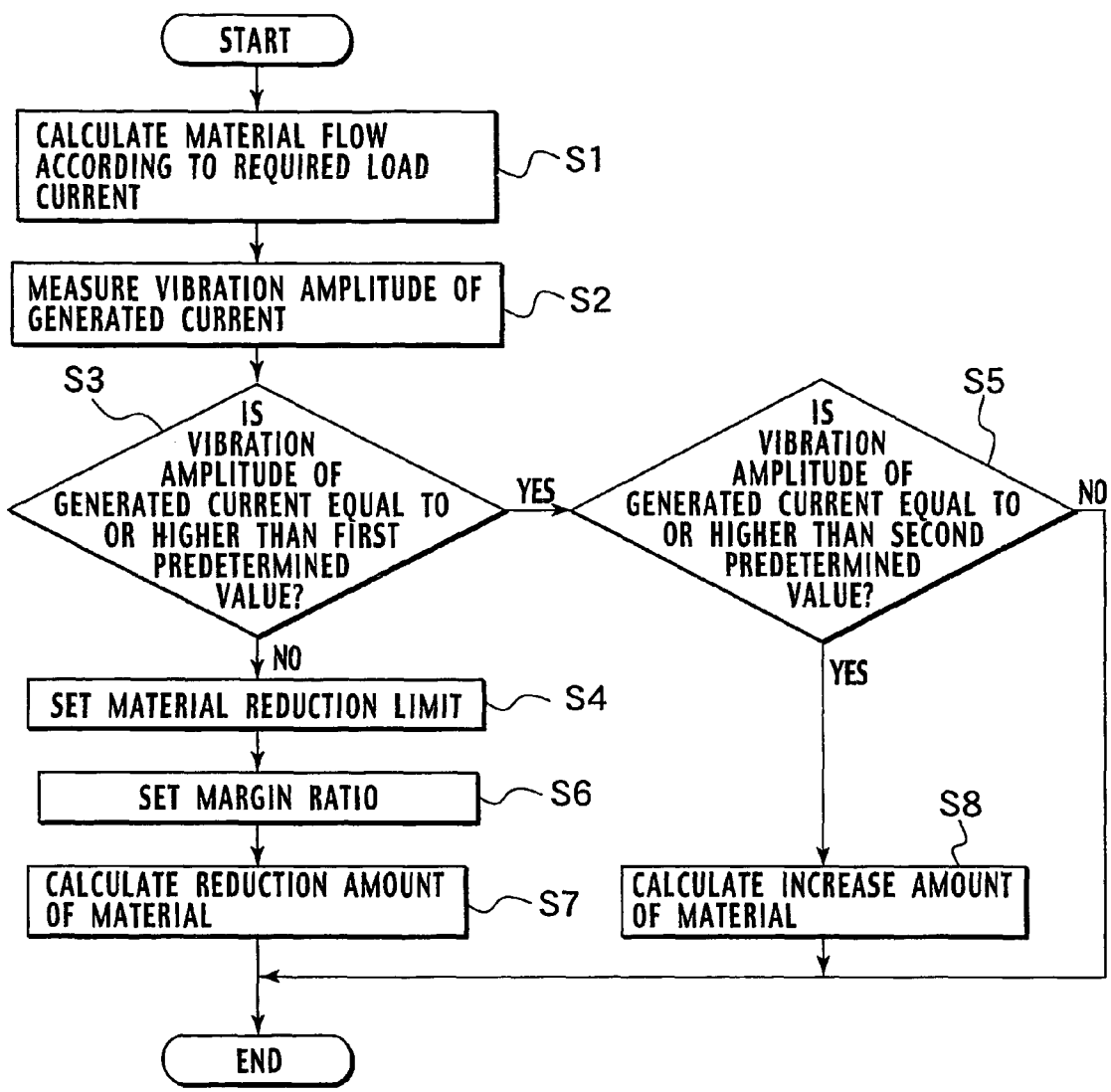
FIG. 2 is a flowchart showing processing procedures for a material flow control processing that is performed by the control device shown in FIG. 1.

Referring to FIG. 2, processing procedures for the material flow control processing for controlling flows of the materials (hydrogen and oxygen) by the control device 3 of the fuel cell system shown in FIG. 1 will be described. The material flow control processing is carried out when a load constant control for setting target power for the power to be extracted from the fuel cell stack 1 and for extracting the target power by the load 2 is exerted.

(A) At a stage S1, the control device 3 calculates a material flow necessary for the fuel cell stack 1 in accordance with a required load current for the load 2. The material flow includes a necessary hydrogen flow and a necessary oxygen flow. Specifically, the control device 3 calculates at least the necessary hydrogen flow based on Faraday's law using the required load current. The control device 3 calculates the necessary oxygen flow necessary for the fuel cell stack 1 to generate the required load current, from the necessary hydrogen flow. The control device 3 sets an oxygen content of the air at, for example, 21 percents.

Specifically, When the required load current of the load 2, that is, target load current is set, the control device 3 calculates the necessary hydrogen flow to be supplied to the fuel cell stack 1, that is, supplied hydrogen flow according to Equation (1).

$$\text{(Supplied hydrogen flow)} = \text{(Target load current)} \times \text{(Coefficient)} \times \text{(Number of cells)} \times \text{(Hydrogen stoichiometric ratio)} \quad (1)$$

In the Equation (1), the coefficient is a value also obtained by the Faraday's law and set at 0.00696 herein. In addition, a unit conversion to NL/min is included in the Equation (1).

When the target load current is set, the control device 3 calculates the necessary air flow to be supplied to the fuel cell stack 1, that is, supplied air flow according to Equation (2).

$$\text{(Supplied air flow)} = \text{(Coefficient)} \times \text{(Target load current (A))} \times \text{((Number of cells)/0.21)} \times \text{(Air stoichiometric ratio)} \quad (2)$$

In the Equation (2), the coefficient is a value also obtained by the Faraday's law, and set at 0.00696/2=0.0348 herein. The unit conversion to NL/min is included in the Equation (2).

If only the material flow corresponding to the required load current is supplied, a material distribution in the fuel cell stack 1 is not uniform and a power generation efficiency is thereby deteriorated. Therefore, according to the first embodiment, the stoichiometric ratio is set so as to supply a material flow more than that corresponding to the required load current to the fuel cell stack 1. This stoichiometric ratio is set at an appropriate value by an experiment or the like in a design phase of the fuel cell system.

However, the stoichiometric ratio is the appropriate value only in the system design phase, and the stoichiometric ration set in the system design phase is not always appropriate according to an operating state or the like of the fuel cell stack 1. Due to this, the control device 3 performs the operations as expressed by the Equations (1) and (2), and then supplies the material flow equal to or higher than the stoichiometric ratio to the fuel cells tack 1 as the material flow according to the operating state of the fuel cell stack 1.

Consequently, the control device 3 controls the air supply device 10 to supply the air flow more than the necessary air flow corresponding to the required load current to the fuel cell stack 1, and to discharge an excessive amount of air. In addition, the control device 3 controls the hydrogen supply device 4 and the cyclic hydrogen pump 9 to supply the hydrogen flow more than the necessary hydrogen flow corresponding to the required load current to the fuel cell stack 1, and to recycle the excessive hydrogen in the fuel cell stack 1.

(B) At a stage S2, the control device 3 reads a sensor signal from the voltage sensor 11 or the current sensor 12, and measures a vibration amplitude of a generated current or a generated voltage after controlling the material flow at the stage S1. The processing procedures will be continued while referring to an instance of measuring the vibration amplitude of the generated current. However, the same processing procedures can be carried out for an instance of measuring the vibration amplitude of the generated voltage.

(C) At a stage S3, the control device 3 determines whether the vibration amplitude of the generated current is equal to or higher than a preset first predetermined value. It is noted that vibration of the generated current hardly occurs while the fuel cell stack 1 stably generates power under the control exerted at the stage S1. Even if the materials are supplied in excess of the material flow corresponding to the required load current, the vibration of the generated current hardly occurs. Accordingly, the control device 3 sets the first predetermined value for determining whether the material flow can be reduced while hardly generating the vibration of the generated current, and compares the vibration amplitude of the generated current measured at the stage S2 with the first predetermined value.

(D) When the control device 3 determines that the vibration amplitude of the generated current is not equal to or higher than the first predetermined value ("NO" at the stage S3), the processing goes to a stage S4. When determining that the vibration amplitude of the generated current is equal to or higher than the first predetermined value ("YES" at the stage S3), the processing goes to a stage S5.

(E) At the stage S5, the control device 3 determines whether the vibration amplitude of the generated current is equal to or higher than a second predetermined value. The "second predetermined value" is set in advance for determining whether the fuel cell stack 1 does not stably generate power due to a smaller material flow. When determining that the vibration amplitude of the generated current is equal to or higher than the second predetermined value ("YES" at the stage S5), the processing goes to a stage S8. When determining that the vibration amplitude of the generated current is not equal to or higher than the second predetermined value ("NO" at the stage S5), the control device 3 finishes the material flow control processing. When the vibration amplitude of the generated current is not equal to or lower than the first predetermined value and not equal to or higher than the second predetermined value but between the first and the second predetermined values, then the control device 3 keeps a present material supply state, and prevents hunting of a control for increasing or reducing the material flow.

Figure 3:
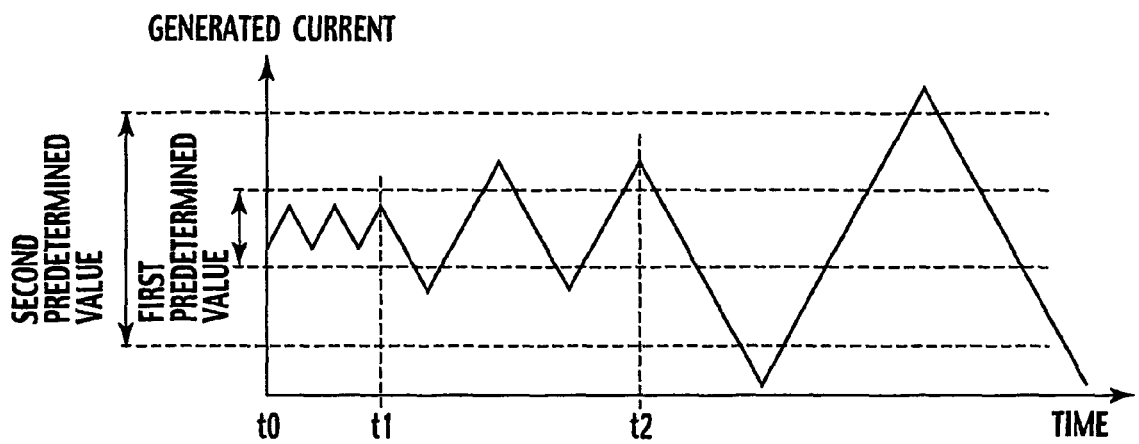
FIG. 3 is a graph for explaining a relationship among a vibration amplitude of a generated current or a vibration amplitude of a generated voltage, a first predetermined amount, and a second predetermined amount.

Namely, in periods from a time t0 to time t1 shown in FIG. 3, the control device 3 determines that the vibration amplitude of the generated current is equal to or lower than the first predetermined value at the stage S3, and that the material flow can be reduced, and the processing goes to the stage S4. In periods from the time t1 to a time t2, the control device 3 determines that the vibration amplitude of the generated current is equal to or higher than the first predetermined value and lower than the second predetermined value at the stages S3 and S5, finishes the material flow control processing, and keeps the present material supply state. After the time t2 shown in FIG. 3, the control device 3 determines that the vibration amplitude of the generated current is equal to or higher than the first predetermined value and the second predetermined value at the stages S3 and S5, and that the materials are insufficient, and the processing goes to the stage S8.

Figure 4:
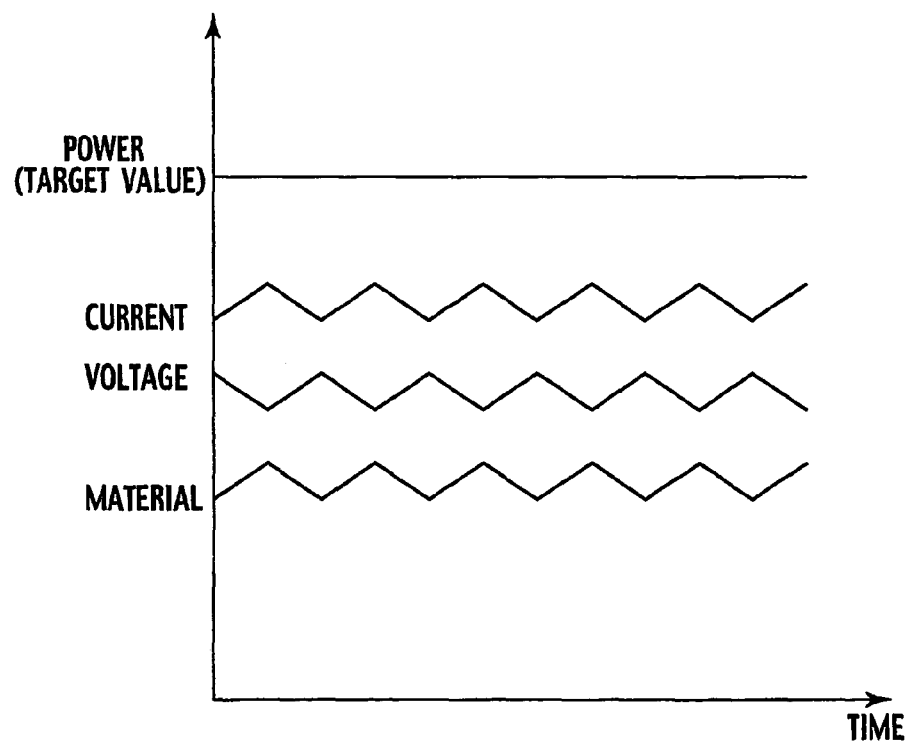
FIG. 4 is a graph for explaining changes in a generated current, a generated voltage, and a material flow when a constant electric power is extracted from the fuel cell stack by a load.

(F) At the stage S4, since the control device 3 determines that the vibration amplitude of the generated current is not equal to or higher than the first predetermined value, the control device 3 sets a limit for reducing the material flow. When the target power is set, the load 2 extracts the same power as the target power, the material flow is reduced as shown in FIG. 4, and the reduced material flow is closer to the limit to the power generation amount, then the generated voltage falls and the generated current rises by as much as a reduction in the generated voltage. When detecting the rise of the generated current, the control device 3 increases the material flow, whereby the generated current rises, the generated voltage falls, and the material flow falls. As can be seen, the control device 3 repeatedly executes the control for increasing the material flow and the control for reducing the material flow in accordance with the rise and fall of the generated current.

In this way, at the stage S4, the control device 3 sets an increase width of the generated current and an reduction width of the generated current large, sets a reduction width of the material flow so as to have a preset amplitude, and sets the limit for reducing the material flow (hereinafter, "material flow reduction limit". After the stage S4, the processing goes to a stage S6.

(G) At the stage S6, the control device 3 sets the material flow reduction limit set at the stage S4 to be high, and sets a margin ratio for ensuring that the load 3 can extracts the target power. At this stage, the control device 3 reads the sensor signal from the temperature sensor 13, and sets the margin ratio higher as the operating temperature of the fuel cell stack 1 is lower. The control device 3 also reads the sensor signal from the cell voltage measurement device 14, sets the margin ratio higher as a difference (irregularity) among respective cell voltages is larger. Besides, the control device 3 sets the margin ratio higher as the amplitude of the generated current measured at the stage S2 is higher.

When the material flow is reduced to near the material flow reduction limit, the generated voltage easily exceeds the lower limit even with a slight change in an operating environment of the fuel cell stack 1. As a result, the robustness of the fuel cell stack 1 to the operating environment is degraded. If an operating temperature of the fuel cell stack 1 is low and power generation efficiency is lowered, or if the cell voltage difference (irregularity) among difference cells is large and an arrival distribution of materials is present in the fuel cell stack 1, the robustness of the fuel cell stack 1 to the operating environment is degraded more conspicuously. In such a state, the generated voltage easily exceeds the lower limit by a slight change in a region to which these various sensors cannot be attached or a slight change which cannot be measured by the sensors. Accordingly, the control device 3 sets the margin ratio for the material flow reduction limit so that the generated voltage does not exceed the lower limit, and sets the actual material reduction limit slightly higher.

Figure 5:
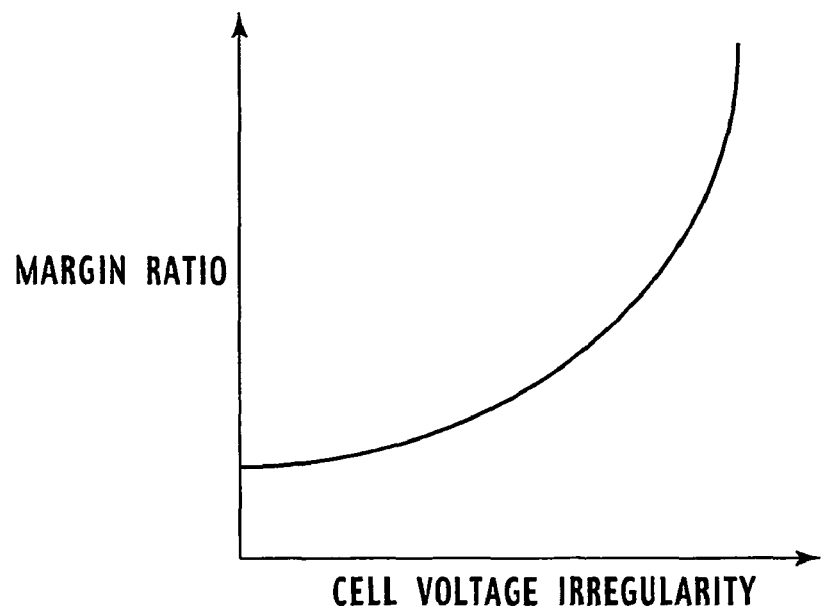
FIG. 5 is a graph showing a relationship between a cell voltage irregularity and a margin ratio.
Figure 6:
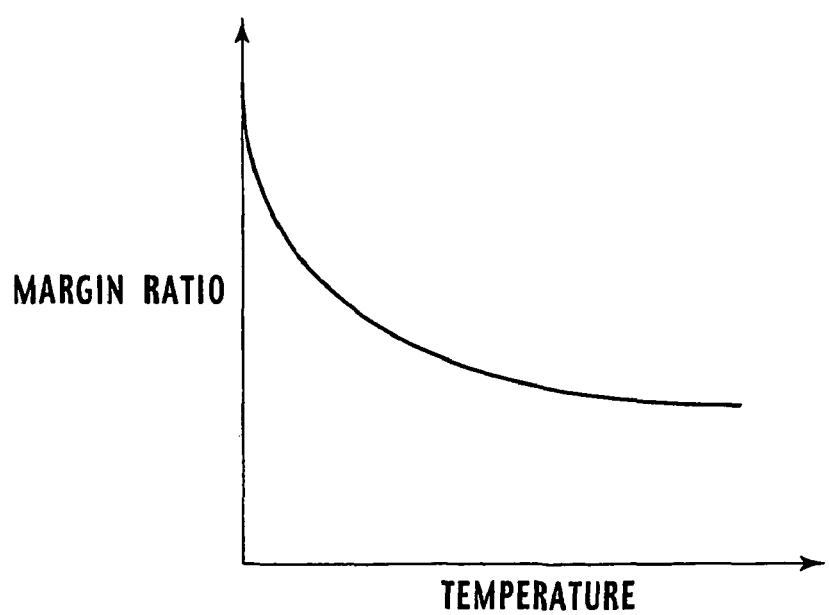
FIG. 6 is a graph showing a relationship between an operating temperature of the fuel cell stack and the margin ratio.

Specifically, the control device 3 stores map data shown in FIGS. 5 and 6 calculated by experiments or the like in advance. The control device 3 sets the margin ratio to be exponentially higher by reference to the map data shown in FIG. 5 as the irregularity of each cell voltage is larger. The control device 3 sets the margin ratio to be exponentially lower by reference to the map data shown in FIG. 6 as the operating temperature of the fuel cell stack 1 is higher. The control device 3 also stores map data, not shown, which indicates a change in the margin ratio relative to the vibration amplitude of the generated current or that of the generated voltage, and sets the margin ratio based on this map data.

According to the first embodiment, the instance in which the control device 3 sets the margin ratio based on the operating temperature of the fuel cell stack 1, the irregularity of each cell voltage, and the vibration amplitude of the generated current is described. However, the present invention is not limited to this instance. For example, the control device 3 may set the margin ratio using parameters for one of the operating temperature of the fuel cell stack 1, the irregularity of each cell voltage, and the vibration amplitude of the generated current. In addition, the control device may set the margin ratio first based on a certain parameter, and change the set margin ratio based on the other parameter. Further, a humidity sensor which detects a humid state of the solid PEM that constitutes the fuel cell stack 1 may be provided at each of the hydrogen electrode and the air electrode, the control device 3 may read a sensor signal from the humidity sensor and set the margin ratio higher as the humidity is lower.

(H) At a stage S7, the control device 3 calculates a material reduction amount by which the material flow currently supplied to the fuel cell stack 1 is reduced in a control cycle of increasing or reducing the material flow.

Figure 7A:
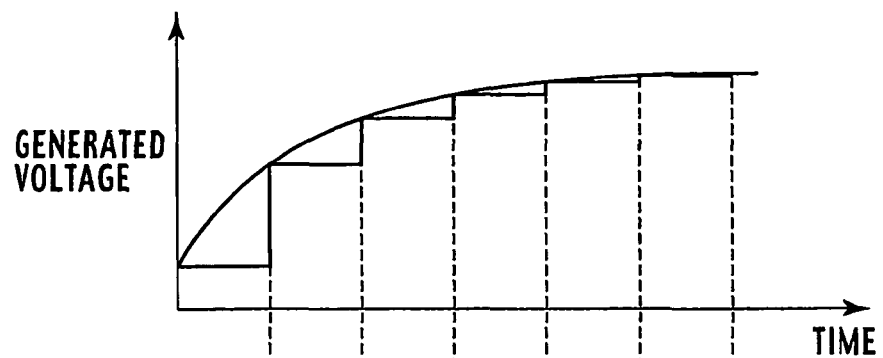
FIG. 7A is a graph showing a change in the generated voltage with the passage of time for explaining the change in the generated voltage relative to change in the material flow.
Figure 7B:
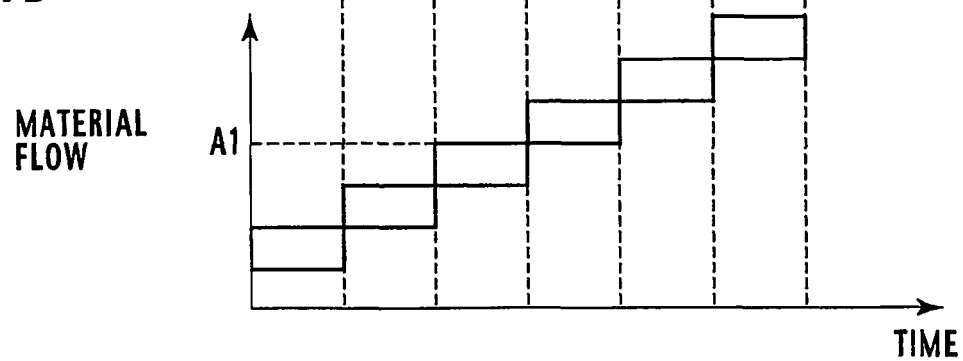
FIG. 7B is a graph showing changes in the material flow with the passage of time for explaining the change in the generated voltage relative to the change in the material flow.
Figure 8:
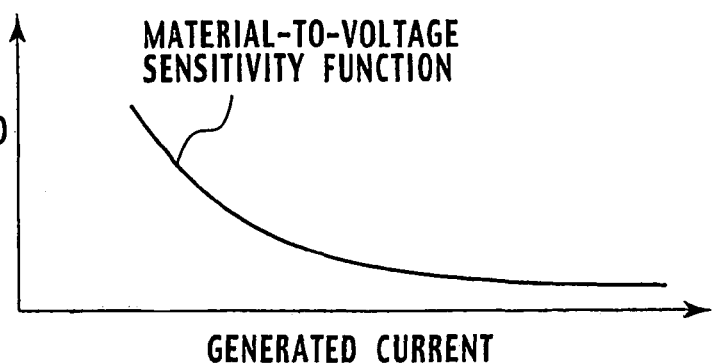
FIG. 8 is a graph showing a relationship between the change in the generated voltage and sensitivity when the generated voltage and the material flow are changed.

When the material flow is changed as shown in FIG. 7B, the generated voltage tends to have great change when the generated voltage is low, as shown in FIG. 7A, and to have small change when the generated voltage is high. That is, even with the same change of the material flow, a voltage variation differs according to the generated voltage. When the material flow is equal to or higher than a predetermined amount A1, the change of the material flow hardly contributes to the voltage variation. Accordingly, even if the material flow is set at the predetermined amount A1 or higher, the generated voltage does not rise, so that the materials are wasted.

Therefore, the control device 3 stores "a material voltage-to-sensitivity function" which indicates a relationship of a change in material flow (sensitivity) to the generated voltage, i.e., how much the generated voltage is changed from the present generated voltage based on power generation characteristics of the fuel cell stack 1 shown in FIGS. 7A and 7B. At the stage S7, the control device 3 predicts a change in generated voltage when the material flow is changed using the material voltage-to-sensitivity function, and calculates the reduction amount of material flow. The control device 3 controls the air supply device 10, the hydrogen supply device 4, and the cyclic hydrogen pump 9 based on the calculated material flow reduction amount to thereby reduce the material flow.

When the vibration amplitude of the generated current is equal to or higher than the second predetermined value ("YES" at the stage S5), the processing goes to the stage S8, at which the control device 3 uses the material voltage-to-sensitivity function similarly to the stage S7. At stage S8, the control device 3 increases the material flow, unlike at the stage S7 which reduces the material flow. This is because the vibration amplitude of the generated current is high. Even if the control device 3 reduces the material flow at the stage S7 and the reduction amount of the material flow is too large, then the control device 3 controls the air supply device 10, the hydrogen device 4, and the cyclic hydrogen pump 9 to recover the material flow based on the material flow at the stage S8.

At the stage S2, the control device 3 determines whether the material flow is increased or reduced using the vibration amplitude of the generated current or that of the generated voltage. However, the present invention is not limited thereto. For example, when an oxygen concentration sensor is provided at the outlet port of the air electrode and an oxygen concentration detected by the oxygen concentration sensor is high, the control device 3 may reduce the material flow. When the oxygen concentration is low, the control device 3 may increase the material flow. Alternatively, when an air flow sensor is provided at the outlet port of the air electrode and an air flow detected by the air flow sensor is high, the control device 3 may reduce the material flow. When the air flow is low, the control device 3 may increase the material flow.

Figure 9:
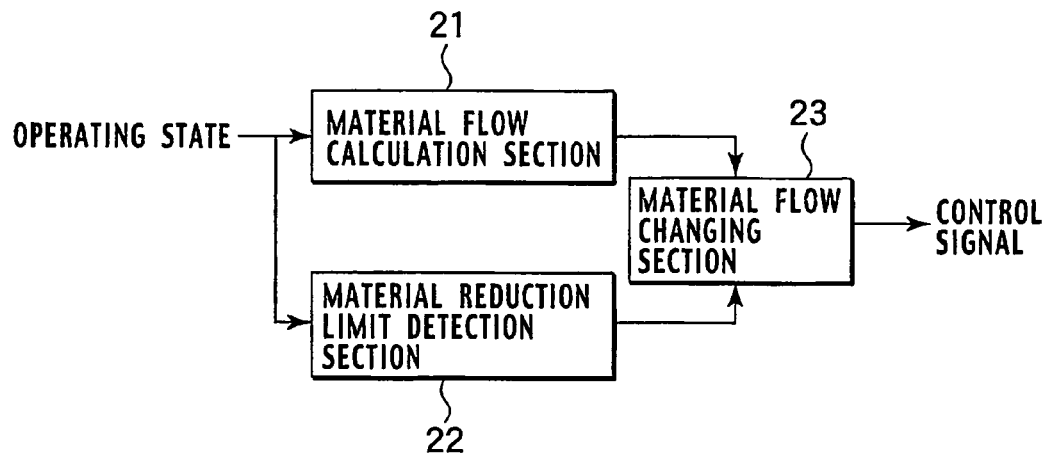
FIG. 9 is a block diagram showing one example of functional configuration of the control device shown in FIG. 1 for performing the material flow control processing.

As shown in FIG. 9, the control device 3 which performs the material flow control processing shown in FIG. 2 includes a material flow calculation section 21 which calculates the material flow based on the operating state of the fuel cell stack 1 at the stages S1 to S3 and the stage S5, a material reduction limit detection section 22 which sets the material flow reduction limit at the stage S4, and a material flow change section 23 which calculates the material flow and which feeds a control signal to the respective sections at the stages S7 and S8.

Figure 10:
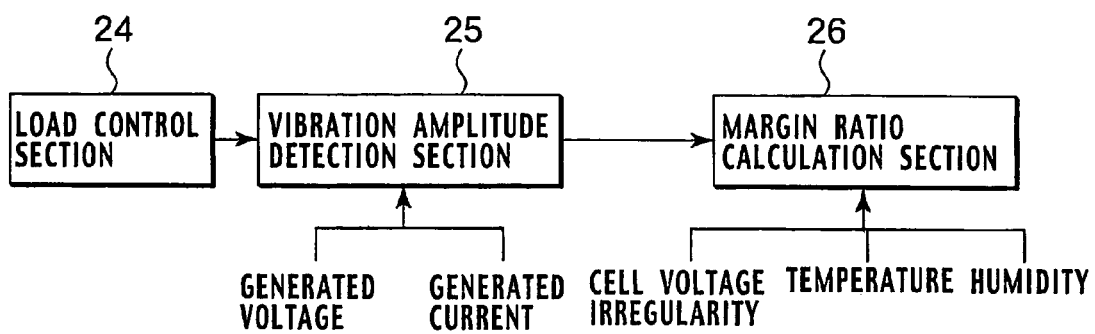
FIG. 10 is a block diagram showing another example of the functional configuration of the control device shown in FIG. 1 for performing the material flow control processing.

Alternatively, the control device 3 may include functional blocks shown in FIG. 10 instead of the functional blocks shown in FIG. 9. Namely, the control device 3 may include a load control section 24 which controls the load 2 so as to extract a target voltage from the fuel cell stack 1, a vibration amplitude detection section 25 which detects the vibration amplitude of the generated current or that of the generated voltage based on the generated current or the generated voltage at the stage S2, and a margin ratio calculation section 26 which calculates the margin ratio based on the vibration amplitude of the generated current or that of the generated voltage, the irregularity of each cell voltage, and the operating temperature of the fuel cell stack 1 or the humidity of the solid PEM at the stage S6.

[ADVANTAGES OF FIRST EMBODIMENT]

As stated above in detail, the fuel cell system according to the first embodiment of the present invention calculates the material flow reduction limit to the reduction of the material flow supplied to the fuel cell stack 1 based on the power generation state of the fuel cell stack 1, and controls the material flow. The fuel cell system can thereby cause the fuel cell stack 1 to generate power while effecting a saving in the materials as large as possible in the present operating state of the fuel cell stack 1, and can supply the power to the load 2. Therefore, it is possible to avoid the waste of the materials supplied to the fuel cell stack 1, and to cause the fuel cell stack 1 to stably generate power.

The fuel cell system according to the first embodiment selects the change of the generated current or that of the generated voltage extracted from the fuel cell stack 1 by the load 2, and calculates the material flow reduction limit based on the change of the generated current or that of the generated voltage. By reducing the material flow according to the material flow reduction limit, the vibration amplitude of the generated current or that of the generated voltage is increased as shown in FIG. 3. It is, therefore, possible to prevent the power generation of the fuel cell stack 1 from being made unstable by the change of the generated current or that of the generated voltage. Namely, by setting the material flow reduction limit high so as not to increase the vibration amplitude of the generated current or that of the generated voltage, the material flow can be reduced.

When the load 2 is controlled to extract the constant power from the fuel cell stack 1 to increase or reduce the material flow as shown in FIG. 4, the fuel cell system according to the first embodiment calculates the material flow reduction limit based on the vibration amplitude of the generated current or that of the generated voltage. It is thereby possible to set the material flow at the material flow reduction limit at an increase point after reducing the generated current or the generated voltage, and to ensure controlling the material flow to be set at the material flow reduction limit.

The fuel cell system according to the first embodiment calculates the margin ratio which indicates a degree of increasing the material flow reduction limit based on the vibration amplitude of the generated current or that of the generated voltage, and on the operating state of the fuel cell stack 1. The material flow can be set higher than the material flow reduction limit, and the robustness of the fuel cell stack 1 to the environmental change that influences the power generation of the fuel cell stack 1 can be kept high. Therefore, even if an error occurs to the setting of the material flow reduction limit due to a noise or the like in the detection of, for example, the operating state of the fuel cell stack 1, it is possible to prevent the material flow from being equal to or lower than the actual limit. In addition, even if a delay occurs to the actual change in the material flow by a delay of control when increasing the material flow from the lower limit, it is possible to ensure preventing the material from being equal to or lower than the actual limit.

The fuel cell system according to the first embodiment sets the margin ratio higher as the vibration amplitude of the generated current or that of the generated voltage is higher. By so setting, even if a delay occurs to a change in the actual material flow when the material flow is to be greatly reduced, it is possible to prevent the actual material flow from being equal to or lower than the limit. The fuel cell system according to the first embodiment sets the margin ratio higher as the operating temperature of the fuel cell stack 1 is lower. By so setting, when the operating temperature of the fuel cell stack 1 is low and the power generation state of the fuel cell stack 1 tends to be unstable, it is possible to prevent the actual material flow from being equal to or lower than the limit. Furthermore, by setting the margin ratio higher as the irregularity of each cell voltage is larger, it is possible to prevent the generated voltage from being equal to or lower than the lower limit even if the material distribution state in the fuel cell stack 1 is irregular. Besides, by setting the margin ratio higher as the humidity of the solid PEM is lower, the generated voltage can be prevented from being equal to or lower than the lower limit even if the humidity of the solid PEM is low and the generated voltage tends to be equal to or lower than the lower limit by a slight environmental change.

The fuel cell system according to the first embodiment calculates the material flow to be increased or reduced based on the material voltage-to-sensitivity function which indicates the generated voltage variation relative to the change in the material flow according to the present generated voltage if the material flow is to be changed based on the material flow reduction limit. By so calculating, it is possible to prevent the generated voltage from being greatly changed according to the change in the material flow and exceeding the limit, and thereby preventing the material flow from being excessively changed.

The fuel cell system according to the first embodiment changes the material flow using the fuel voltage-to-sensitivity function according to the present generated voltage. It is thereby possible to predict a change in the generated voltage when the material flow is changed, and prevent excessive increase or reduction of the materials. In addition, it is possible to prevent the generated voltage from being greatly changed according to the change in the material flow and exceeding the limit, and thereby prevent the material flow from being excessively changed. At the same time, it is possible to prevent an insufficient change in the material flow when the material flow is to be reduced.

When the air flow discharged from the fuel cell stack 1 or the oxygen concentration in the discharged air is lower than the predetermined value by reducing the material flow, the fuel cell system according to the first embodiment sets the reduced material flow as the material flow reduction limit. It is thereby possible to set the material flow reduction limit in accordance with changes in the air and oxygen consumed by a power generation reaction that actually occurs to the fuel cell stack 1. Thus, the material flow reduction limit can be easily accurately set.

Namely, when almost all oxygen is consumed by the power generation reaction of the fuel cell stack 1 by the reduction of the air flow, components of the exhaust air are almost nitrogen and the oxygen concentration of the exhaust air is reduced. In order to keep the oxygen distribution in the fuel cell stack 1 uniform and to efficiently trigger the power generation reaction, it is necessary to supply the air in excess of the required power generation amount to the fuel cell stack 1, and to keep the oxygen concentration of the exhaust air to be equal to or higher than the predetermined value. The fuel cell system according to the first embodiment can set the material flow reduction limit and control the material flow using these power generation reaction characteristics.

The fuel cell system according to the first embodiment increases or reduces the material flow so that the vibration amplitude of the generated current or that of the generated voltage extracted from the fuel cell stack 1 is equal to or lower than the second predetermined value, and increases or reduces the material flow so that the air flow discharged from the-fuel cell stack l or the concentration of oxygen contained in the exhaust air falls within the predetermined range. It is thereby possible to reduce the material flow to be equal to or lower than the material flow reduction limit and thereby save the materials, and to prevent the generated voltage from being equal to or lower than the lower limit without reducing the material flow to be equal to or lower than the material flow reduction limit.

When the material flow is reduced, the generated voltage falls. The lower limit voltage that indicates a width by which the materials can be reduced depends on the operating state. The fuel cell system according to the first embodiment, therefore, detects the lower limit voltage when reducing the material flow. The materials can be thereby reduced as much as possible, and the waste of the materials can be eliminated.

Moreover, when the material flow is increased to restore the generated voltage, the fuel cell system according to the first embodiment gives regard to characteristics of the fuel cell stack 1 that the increase width of the generated voltage is smaller as the material flow is increased and the generated voltage rises. It is thereby possible to avoid the waste of the materials without excessively increasing or excessively reducing the material flow. The reason is as follows. When the generated voltage is low, the generated voltage has great change according to the increase amount of the material flow. However, when the generated voltage is high to some extent, the increase width of the generated voltage is saturated relative to the increase amount of the material flow.

As can be understood, the fuel cell system according to the first embodiment calculates the limit for reducing the material flow to be supplied to the fuel cell stack 1, and controls the material flow. Therefore, the fuel cell system according to the first embodiment enables the fuel cell stack to generate power while effecting the saving in the materials as large as possible in the present operating state of the fuel cells, and the power can be supplied to the load 1. According to the first embodiment of the present invention, therefore, the fuel cell system control device capable of eliminating the waste of materials supplied to the fuel cells, and ensuring that the fuel cells stably generate power can be provided.

(Second Embodiment)

In a second embodiment of the present invention, a fuel cell system which reduces an air stoichiometric ratio, which stabilizes a generated voltage, and which thereby improves a fuel consumption performance will be described.

The fuel cell system includes an anode electrode supplied with a hydrogen gas, a cathode electrode supplied with an oxidizing agent gas such as the air, and an oxidizing agent gas supply device (e.g., air supply device) which supplies the oxidizing agent gas to the cathode electrode. The fuel cell system triggers a chemical reaction between oxygen at the cathode electrode and hydrogen at the anode electrode, and thereby generates power.

In order to improve the fuel consumption of the fuel cell system, it is necessary to reduce power consumption of the air supply device. Namely, it is necessary to operate the system while reducing an air flow to be supplied as much as possible, and reducing the air stoichiometric ratio. Therefore, when the load connected to the fuel cell is transiently increased, an amount of oxygen used by the fuel cell may possibly be transiently increased and the air flow may possibly become insufficient. Specifically, voltage abnormally falls or the irregularities of respective cell voltages increase by a slight state change within the fuel cell, generated voltage is made unstable, and an operation of the fuel cell cannot be continued. Since the slight state change within the fuel cell cannot be detected by a sensor or the like, it is impossible to detect whether the generated voltage is made unstable beforehand, and timing of increasing the air stoichiometric ratio delays.

To improve the fuel consumption of the fuel cell stack, it is thus necessary to reduce the air stoichiometric ratio and stabilize the generated voltage.

As a method for detecting whether the generated voltage is stable, a method for determining an abnormality by voltage variation when the air stoichiometric ratio is reduced down to an operation limit is known (Patent Literature 1). According to the Patent Literature 1 (Japanese Patent Application Laid-Open Publication No. H08-007911), a state of reducing the air stoichiometric ratio is a state in which the oxygen concentration of the cathode electrode of the fuel cell is reduced. The method uses a function that a voltage drop of a defective cell or a cell having an unsatisfactory oxygen distribution is amplified in this state and appears conspicuously.

However, with a view of improving the fuel consumption, the system normally operates while setting the air stoichiometric ratio to near an operating limit. If so, the method disclosed in the Literature 1 cannot detect whether the generated voltage is unstable. As a result, a defect may possibly occur that the generated voltage abnormally falls or the irregularities of the respective cell voltages increase and the operation cannot be continued.

Figure 11:
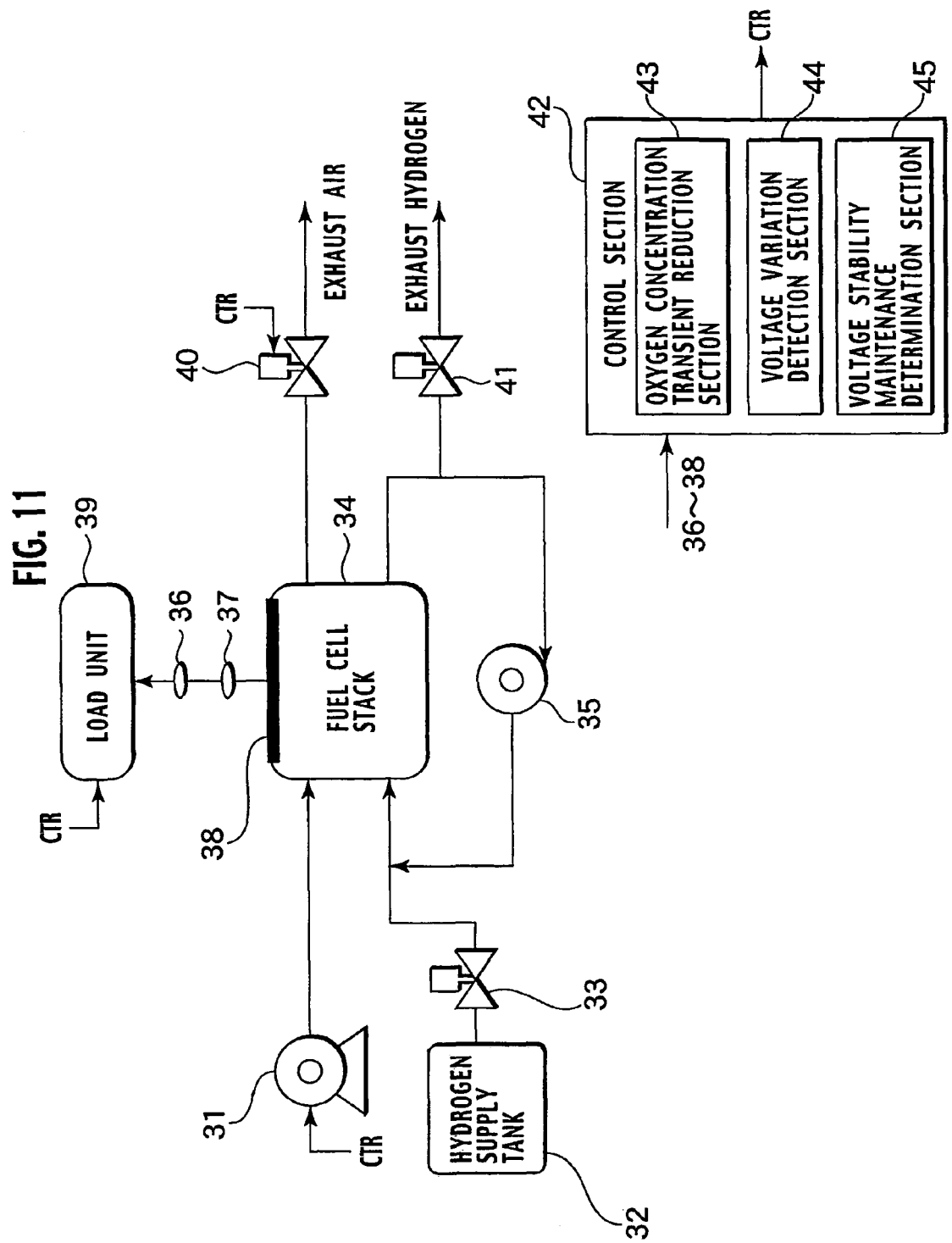
FIG. 11 is a block diagram showing a fuel cell system according to a second embodiment of the present invention.

As shown in FIG. 11, the fuel cell system according to the second embodiment includes the anode electrode supplied with the fuel gas which is a material gas, and the cathode electrode supplied with the oxidizing agent gas which is also a material gas. The fuel cell system also includes a fuel cell stack 34 which generates power by the electrochemical reaction of the oxygen at the cathode electrode with the hydrogen at the anode electrode, a fuel gas supply device (hydrogen supply tank) 32 which supplies the fuel gas to the fuel cell stack 34, a hydrogen pressure regulator 33 which regulates a pressure of the fuel gas supplied from the hydrogen supply tank 32, a hydrogen circulation pump 35 arranged on a hydrogen circulation path for returning unused fuel gas discharged from an outlet port of the anode electrode to an inlet port of the anode electrode for recycle, an oxidizing agent gas supply device (air supply device) 32 which supplies the oxidizing agent gas to the fuel cell stack 34, a load device 30 connected to the fuel cell stack 34 and consuming the power generated by the fuel cell stack 34, a voltage detection section (voltage sensor) 36 which detects the power generated by the fuel cell stack 34, a current detection section (current sensor) 37 which detects a current flow carried from the fuel cell stack 34 to the load device 39, a cell voltage sensor 38 which detects voltages of a plurality of fuel cells (hereinafter, "cells"that constitute the fuel cell stack 34, an air pressure regulation valve 40 which detects the pressure of the cathode electrode, a purging regulation valve 41 which discharges nitrogen accumulated in a hydrogen circulation system, and a control section 42 which controls an overall operation of the fuel cell system.

The control section 42 includes an oxygen concentration transient reduction section 43 which transiently reduces the oxygen concentration at the cathode electrode, a voltage variation detection section 44 which detects a voltage variation when the oxygen concentration is transiently reduced by the oxygen concentration transient reduction section 43, and a voltage stability maintenance determination section 45 which determines whether a present oxygen utilization ratio is appropriate for maintaining the voltage of the fuel cell stack 34 stable based on an output of the voltage variation detection section 44. The voltage sensor 36, the current sensor 37, and the cell voltage sensor 38 transfer a voltage value, a current value, and a voltage value to the control section 42, respectively. The control section 42 controls operations of the respective constituent elements of the fuel cell system including the air supply device 31, the load device 39, and the air pressure regulation valve 40 through a control signal CTR.

Figure 19:
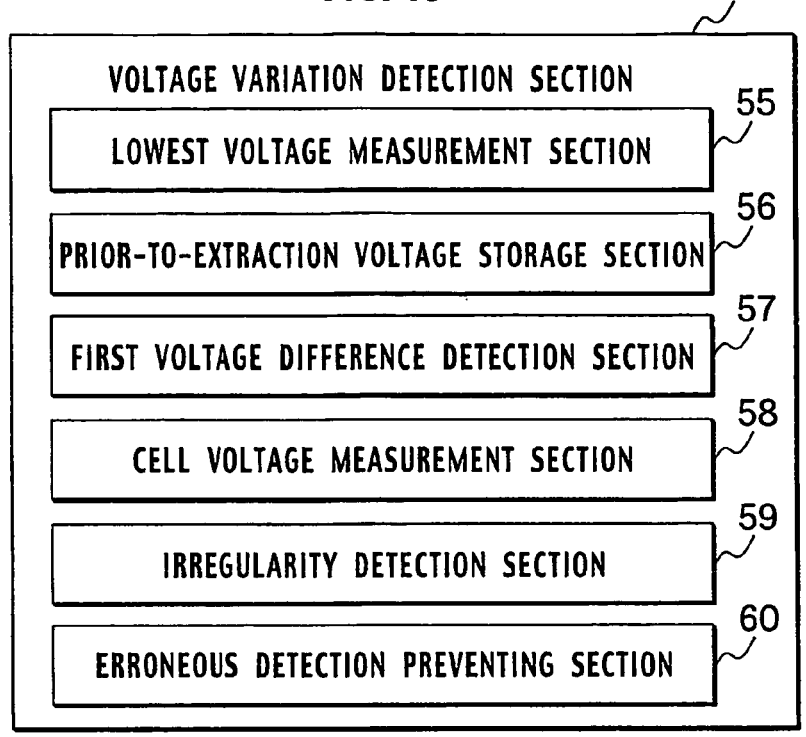
FIG. 19 is a block diagram showing one example of a voltage variation detection section shown in FIG. 11.

As shown in FIG. 19, the voltage variation detection section 44 includes at least a lowest voltage measurement section 55 which measures the voltage when the oxygen concentration is transiently reduced by the oxygen concentration transient reduction section 43 and the voltage of the fuel cell stack 34 falls to the lowest voltage, a prior-to-extraction voltage storage section 56 which stores the voltage before the load is extracted, and a first voltage difference detection section 57 which detects a difference between the lowest voltage and the prior-to-extraction voltage.

The voltage variation detection section 44 also includes a cell voltage measurement section 58 which measures the respective cell voltages of the fuel cell stack 34 right after the oxygen concentration is transiently reduced by the oxygen concentration transient reduction section 43, and an irregularity detection section 59 which detects the irregularity of each cell voltage based on an output of the cell voltage measurement section 58.

Figure 20:
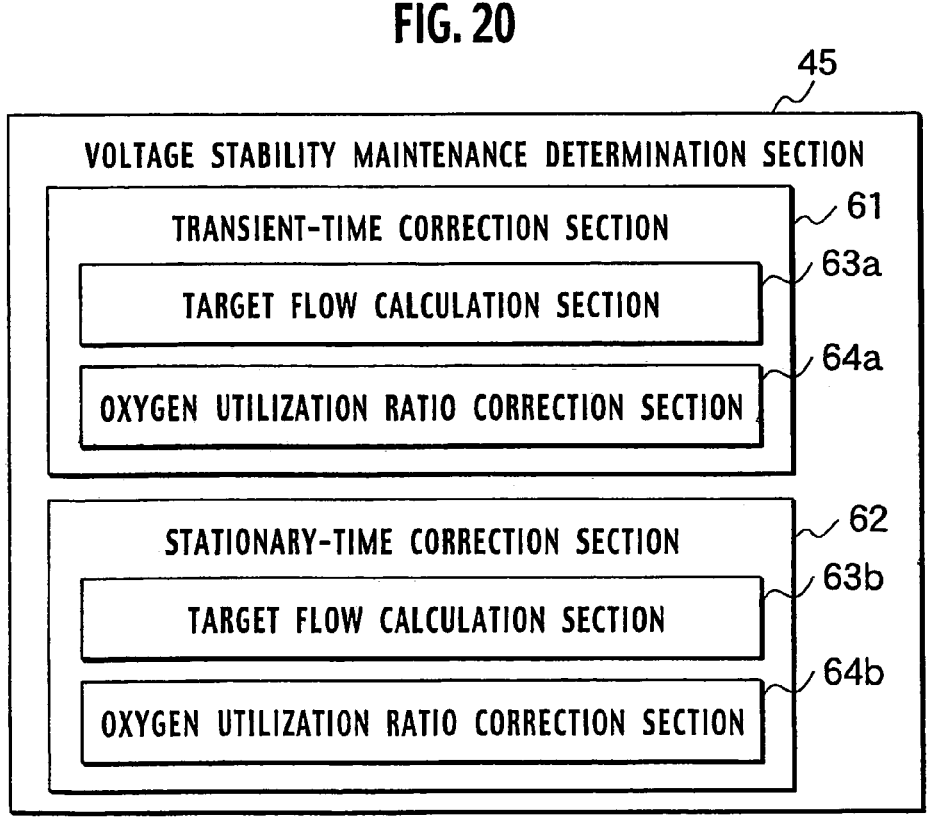
FIG. 20 is a block diagram showing a voltage stability maintenance determination section shown in FIG. 11.

As shown in FIG. 20, the voltage stability maintenance determination section 45 includes a transient-time correction section 61 which determines that the present oxygen utilization ratio is inappropriate for maintaining the voltage of the fuel cell at the transient time stable if the output of the voltage variation detection section 44 exceeds a predetermined value, and a stationary-time correction section 62 which reduces the oxygen utilization ratio at the transient time similarly to the transient-time correction section 61.

As shown in FIG. 19, the voltage variation detection section 44 further includes an erroneous detection prevention section 60 which blows off water remaining in the cathode electrode and which discharges the water to the outside. The erroneous detection prevention section 60 increases a flow of the oxidizing agent gas or a pressure difference between the inlet and the outlet of the cathode electrode, and thereby accelerates a flow velocity of the oxidizing gas within the cathode electrode when the output of the voltage variation detection section 44 deviates from a predetermined limit. This operation will be referred to as "water blowoff purging".

The transient-time correction section 61 and the stationary-time correction section 62 include target flow calculation sections 63$a$ and 63$b$ each calculating a target air flow based on a target power generation amount and a target oxygen utilization ratio, and oxygen utilization ratio correction sections 64$a$ and 64$b$ each applying an advancement/delay compensation filter to the target air flow calculated by the target flow calculation section 63$a$ or 63$b$, changing parameters for the advancement/delay compensation filter, and correcting the oxygen utilization ratio, respectively.

A part of the hydrogen supplied to the anode electrode of the fuel cell stack 34 is discharged from the outlet of the anode electrode without being used for power generation. This discharge hydrogen is returned to the inlet of the anode electrode for recycling. Thereafter, the hydrogen returned to the inlet of the anode electrode for recycling will be referred to as "cyclic hydrogen". Hydrogen gas in which the hydrogen supplied from the hydrogen supply tank 32 is mixed with the cyclic hydrogen is supplied to the anode electrode. Since the cyclic hydrogen contains much water vapor, the cyclic hydrogen is mixed with the dry hydrogen supplied from the hydrogen supply tank 32 to humidify the hydrogen supplied to the anode electrode. A hydrogen mixture of the hydrogen supplied from the hydrogen supply tank 32 and the cyclic hydrogen is supplied to the anode electrode, and a solid PEM of the fuel cell stack 34 is sufficiently humidified. Further, a hydrogen circulation pump 35 is used for circulating the cyclic hydrogen.

According to the second embodiment, a compressor is employed as the air supply device 31. In the load device 39, an inverter is connected to the fuel cell stack 34, converts energy into power, and supplies the power to a driving motor. If the fuel cell system is applied to a vehicle, the driving motor is used to generate a driving power for operating the vehicle. In addition, the power generation amount is set to the load device 39, and a load current from the fuel cell stack 34 is extracted by the load device 39. The control section 42 is composed of a central processing unit (CPU) of an ordinary computer system and a peripheral interface thereof.

As the fuel cell stack 34 for vehicle, a solid polymer membrane fuel cell stack is used. The solid polymer membrane fuel cell stack 34 includes a solid polymer membrane arranged between the anode electrode and the cathode electrode, and the solid polymer membrane functions as a hydrogen ion conductor. The hydrogen gas is decomposed to hydrogen ions and electrons in the anode electrode of the fuel cell stack 34, whereas the oxygen gas, the hydrogen ions, and the electrons are chemically bonded together to generate water in the cathode electrode thereof. At this time, the hydrogen ions travel to the cathode electrode via the solid polymer membrane. In order so that the hydrogen ions travel via the solid polymer membrane, the solid polymer membrane needs to contain water vapor. In order to humidify the solid polymer membrane, the hydrogen supplied to the fuel cells is humidified and the humidified hydrogen is supplied to the anode electrode. To humidify the hydrogen, the hydrogen cycling technique for recirculating the hydrogen gas which is not used by the fuel cell stack 34 to the fuel cell stack 34 so as to be recycled by the fuel cell stack 34 is used. Specifically, the hydrogen is supplied to the anode electrode by an amount slightly larger than a required hydrogen amount to generate power consumed by the load connected to the outside of the fuel cell stack 34, the unused exhaust hydrogen gas (cyclic hydrogen) discharged from the outlet port of the cathode electrode is returned again to the inlet port of the anode electrode for recycling. Therefore, the hydrogen flow, which includes the hydrogen flow necessary for power generation and the excessive cyclic hydrogen flow, passes through the anode electrode of the fuel cell stack 34.

By supplying the hydrogen flow larger than the hydrogen flow necessary for power generation to the anode electrode, all the cells that constitute the fuel cell stack 34 are enabled to efficiently generate power. If only the hydrogen flow necessary for power generation is supplied to the anode electrode, hydrogen does not efficiently reach the cells near the outlet port of the anode electrode, and the power generation efficiency is deteriorated. Similarly, not an oxygen flow necessary for power generation but a slightly excessive oxygen flow slightly is supplied to the cathode electrode. Therefore, by supplying not only the oxygen flow necessary for power generation but the slightly excessive oxygen flow to the cathode electrode, all the cells that constitute the fuel cell stack 34 are enabled to efficiently generate power.

A ratio of actually supplied oxygen flow/hydrogen flow to oxygen flow/hydrogen flow used for power generation is referred to as an oxygen stoichiometric ratio/hydrogen stoichiometric ratio. If only the hydrogen or oxygen used for power generation is supplied, the hydrogen stoichiometric ratio or the oxygen stoichiometric ratio is "1". Normally, however, the ratio is set higher than "1" for the reasons stated above.

When the load is transiently increased, the hydrogen flow necessary for the reaction of each fuel cell is transiently increased. Since the hydrogen is supplied from the hydrogen supply tank 32, a supply delay of the hydrogen occurs. Likewise, the oxygen amount necessary for the reaction of each fuel cell is transiently increased. Since the oxygen is supplied from the air supply device 31 and larger in mass than the hydrogen, a supply delay of the oxygen is more conspicuous than that of the hydrogen. Due to this, when the load is transiently increased, there is a high probability of shortage of the air.

Referring next to FIGS. 12 to 15, one example of specific operations of the fuel cell system shown in FIG. 11 will next be described.

(a) At a stage S10, a response of the load extracted from the fuel cell stack 34 is selected. Namely, the load is extracted by a faster response than an air supply response, and a low oxygen concentration state is transiently created. Specifically, the oxygen concentration transient reduction section 43 increases the load extracted from the fuel cell stack 34 by the faster response than the air supply response in which the air arrives from the air supply device 31 to the cathode electrode, thereby transiently reducing the oxygen concentration of the cathode electrode of the fuel cell stack 34. It is noted that the air supply response can be known from data on an experiment conducted in advance. When the load extraction response is too fast, the transient voltage drop often falls below the lower limit. Considering this, as the load is heavier, the load extraction response is set slower.

Figure 13A:
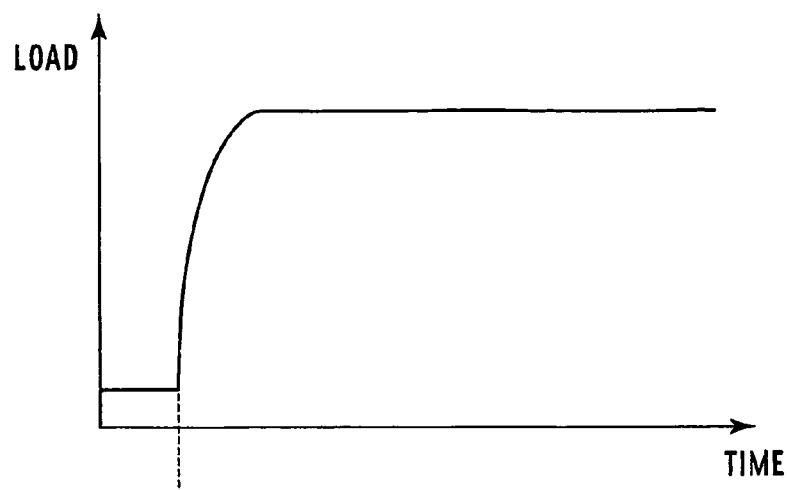
FIG. 13A is a graph showing a voltage locus (time response) by a transitional load.
Figure 13B:
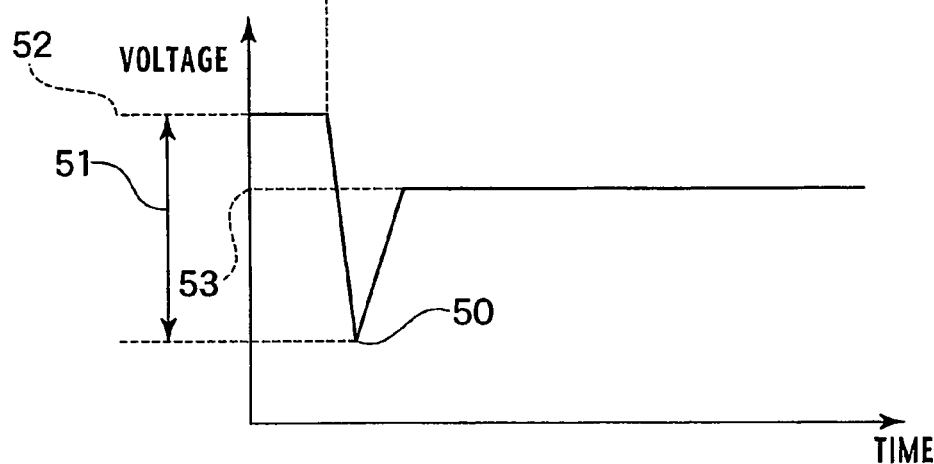
FIG. 13B is a graph showing a change in a voltage measured through a voltage sensor with the passage of time (a voltage difference)

(b) At a stage S20, the voltage variation detection section 44 measures a voltage drop (voltage difference) 51 through the voltage sensor 36 when the oxygen concentration is transiently reduced, that is, when the load is transiently extracted as shown in FIG. 13A. Specifically, as shown in FIG. 13B, the lowest voltage measurement section 55 measures a voltage when the oxygen concentration transient reduction section 43 transiently reduces the oxygen concentration and the voltage of the fuel cell stack 34 falls down to a lowest voltage 50. The prior-to-extraction voltage storage section 56 stores a voltage 52 before extracting the load. The first voltage difference detection section 57 detects a difference (voltage difference 51) between the lowest voltage 50 and the voltage 52 before extracting the load.

Figure 14A:
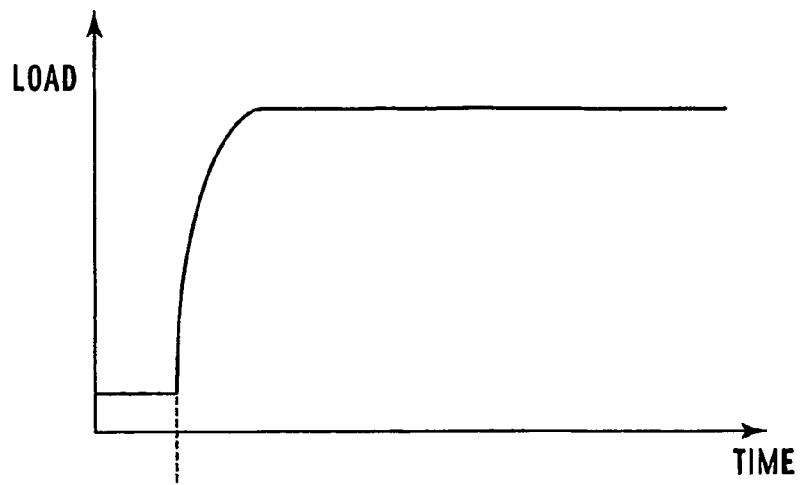
FIG. 14A is a graph showing a voltage locus (time response) by a transitional load.
Figure 14B:
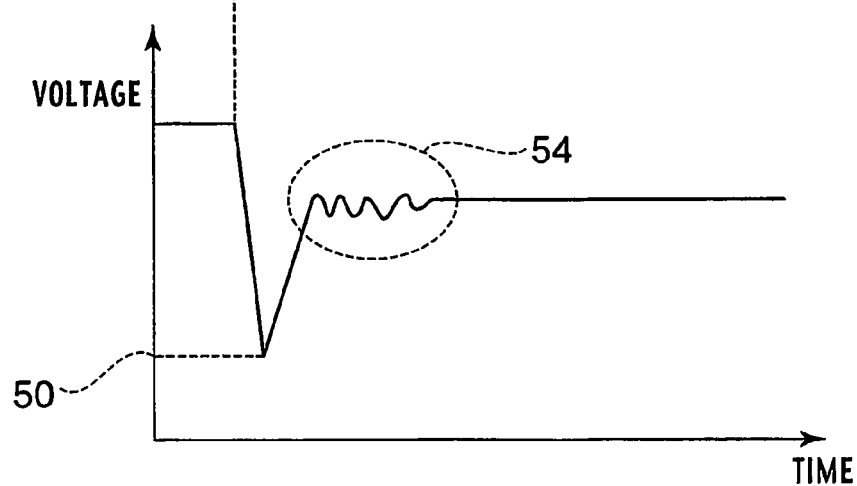
FIG. 14B is a graph showing a change in the voltage measured through the voltage sensor with the passage of time (a voltage irregularity)

(c) At a stage S30, the cell voltage measurement section 58 measures each cell voltage through the cell voltage sensor 38 right after the oxygen concentration transient reduction section 43 transiently reduces the oxygen concentration, that is, the load is transiently extracted as shown in FIG. 14A, the voltage falls down to the lowest voltage 50. The irregularity measurement section 59 detects an irregularity 54 of each cell voltage based on an output of the cell voltage sensor 38 as shown in FIG. 14B.

(d) At a stage S40, it is determined whether the voltage drop (voltage difference) 51 measured at the stage S20 is smaller than a predetermined lower limit. When the voltage drop (voltage difference) 51 is smaller than the predetermined lower limit ("YES" at the stage S40), the processing goes to a stage S50. When the voltage drop (voltage difference) 51 is equal to or greater than the predetermined lower limit ("NO" at the stage S40), the processing goes to a stage S90. It is noted that the predetermined lower limit is set higher than an operation limit lower limit.

(e) At the stage S50, it is determined whether the irregularity 54 of each cell voltage measured at the stage S30 falls within a predetermined limit. When the irregularity 54 of each cell voltage falls within the predetermined limit ("YES" at the stage S50), the processing goes to a stage S95. When the irregularity 54 exceeds the predetermined limit ("NO" at the stage S50), the processing goes to a stage S90. It is noted that the predetermined limit is set smaller than an operation limit irregularity.

(f) When the determination result at the stage S40 is "NO", the erroneous detection prevention section 60 determines that a situation in which the voltage drop (voltage difference) 51 is grater than the operation limit lower limit but below the predetermined lower limit signifies that the voltage falls due to some factor other than shortage of the air. When the determination result at the stage S50 is "NO", the erroneous detection prevention section 60 determines that a situation in which the irregularity 54 is smaller than the operation limit irregularity but exceeds the predetermined limit signifies that the irregularity of each cell voltage increases due to some factor other than the shortage of the air. The most frequent factor is occurrence of a phenomenon that generated water remaining in an air channel of each fuel cell and closes the channel. According to the second embodiment, the remaining water is blown off so as to eliminate this phenomenon first. At the stage S90, therefore, the erroneous detection prevention section 60 determines whether the water blowoff purging is continuously executed a predetermined number of times. When the voltage does not recover even after the water blowoff purging is continuously executed the predetermined number of times ("YES" at the stage S90), the erroneous detection prevention section 60 determines that an abnormality occurs and the processing goes to a stage S110, at which the erroneous detection prevention section 60 issues "an abnormality alarm".

(g) When the water blowoff purging is not continuously executed the predetermined number of times ("NO" at the stage S90), the processing goes to a stage S100, at which the erroneous detection prevention section 60 performs water blowoff purging for blowing off the water remaining in the air channel of each fuel cell. The water blowoff purging according to the second embodiment is performed by increasing a pressure difference between the inlet and the outlet of the cathode electrode. The cathode electrode pressure control valve (air pressure regulation valve) 40 is operated to set the pressure of the cathode electrode high. Thereafter, the opening of the cathode electrode pressure control valve 40 is increased at a burst to release the pressure. At this time, the air passes through the cathode electrode of the fuel cell stack 34 at a burst and is output together with the water. Next, at a stage S105, a variable indicating whether the water blowoff purging is continued the predetermined times is counted up.

At a stage S95, a water blowoff counter is reset under conditions that the voltage drop is within the predetermined value and the irregularity of each cell voltage is within the predetermined limit, that is, the water blowoff operation is unnecessary.

Figure 13C:
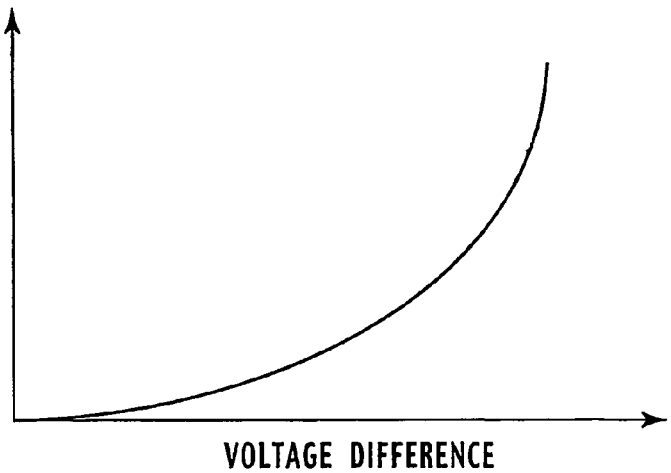
FIG. 13C is a graph showing a relationship between the voltage difference shown in FIG. 13B and a correction amount for increasing the air flow at transient time.

(h) At a stage S60, the transient-time correction section 61 determines that the present oxygen utilization ratio is inappropriate to maintain the voltage of the fuel cell at the transient time stable, and reduces the oxygen utilization ratio at the transient time. Specifically, the transient-time correction section 61 corrects the air flow at the transient time to be increased in accordance with a difference between the voltage when the load is transiently extracted and the voltage falls down to the lowest voltage and the voltage before extracting the load. As shown in FIG. 13C, the air flow at the transient time is corrected to be increased as the voltage difference 51 is larger. More specifically, the target flow calculation section 63a calculates a target air flow based on a target power generation amount and a target oxygen utilization ratio. The oxygen utilization ratio correction section 64a applies the advancement/delay compensation filter as shown in FIG. 15A to the target air flow calculated by the target flow calculation section 63a, changes parameters for the advancement/delay compensation filter, and corrects the oxygen utilization ratio. As shown in FIG. 15B, the air flow at the transient time can be increased by setting an advancement compensation amount (a1/c) large.

The target air flow is calculated based on the target load current and the air utilization ratio stored in the ROM in advance as expressed below. "Coefficient" is a value obtained by multiplying a Faraday's constant and [NL/min] by a unit conversion coefficient, that is, 0.0348. The Faraday's constant is an electric charge held by a group of particles of one mole having an elementary electric charge, and F=Ne. N is an Avogadro constant.

Target load current [A]=(Target load [kW])÷(Present voltage [V])

Necessary oxygen amount [NL/min]=Coefficient×(Target load current [A])×(Number of cells)

Target air flow [NL/min]=(Necessary oxygen amount)×(Air utilization ratio/0.21)

Figure 14C:
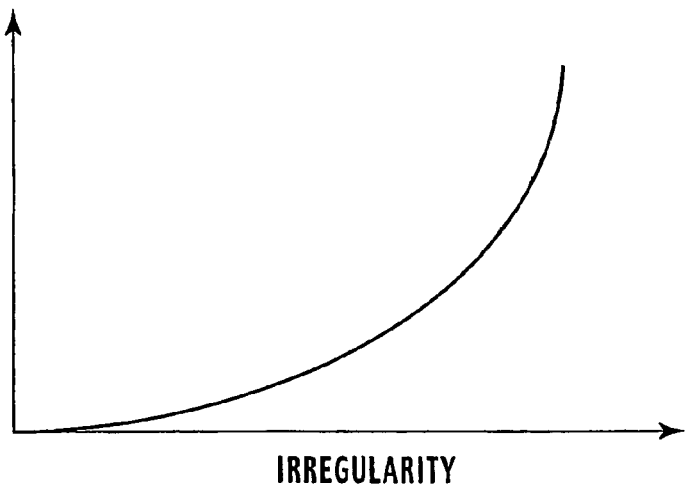
FIG. 14C is a graph showing a relationship between the voltage irregularity shown in FIG. 14B and a correction amount for increasing the air flow at transient time.
Figure 16:
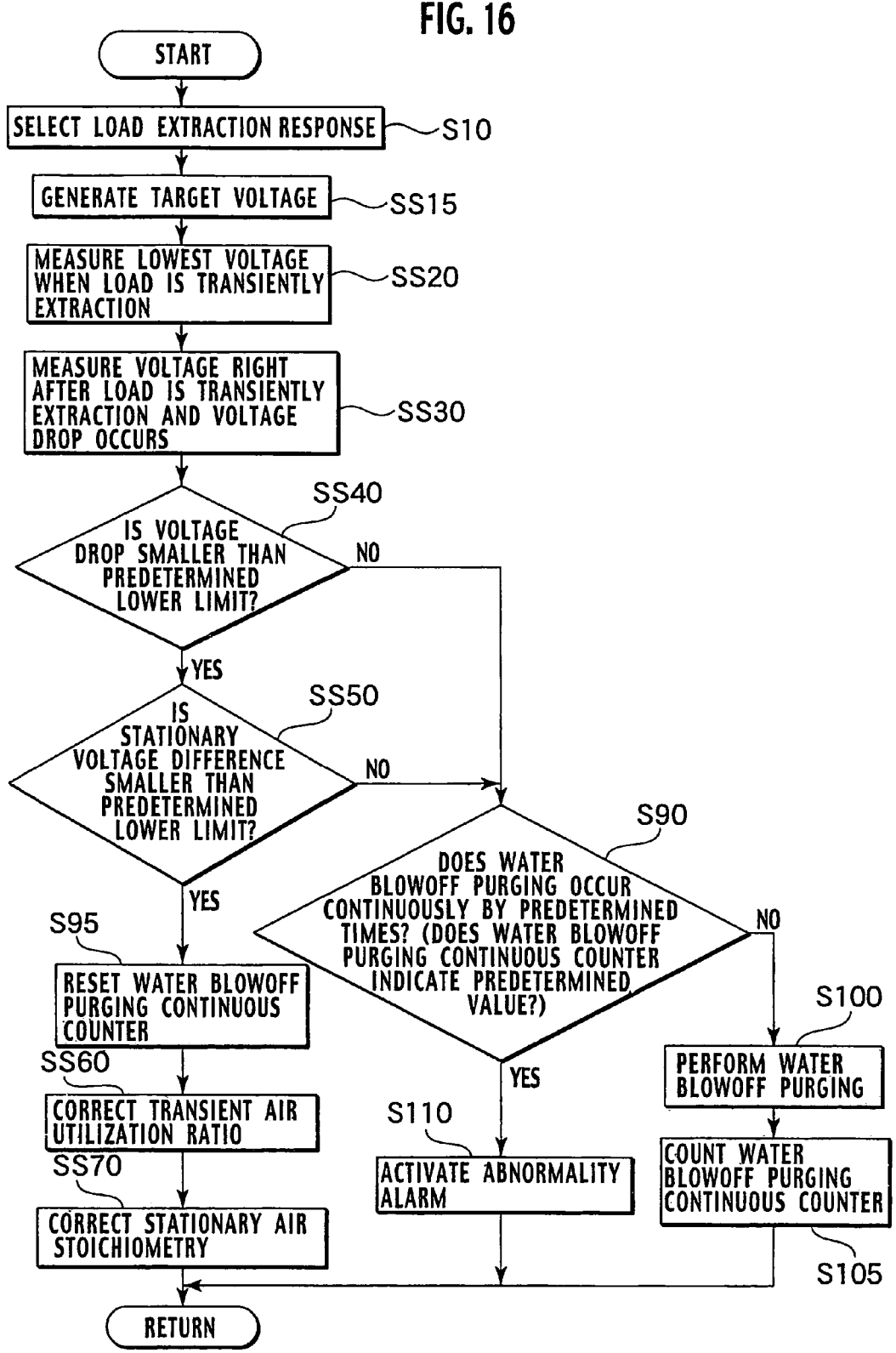
FIG. 16 is a flowchart showing another example of specific operations of the fuel cell system shown in FIG. 11.

(i) At a stage S70, the stationary-time correction section 62 determines that the present oxygen utilization ratio is inappropriate to maintain the fuel cell voltage at the stationary time stable, and reduces the stationary-time oxygen utilization ratio. Specifically, the stationary-time correction section 62 corrects the air flow at the stationary time to be increased in accordance with the irregularity of each cell voltage right after the load is transiently extracted and the voltage falls down to the lowest voltage. As shown in FIG. 14C, the air flow at the stationary time is corrected to be increased as the irregularity 54 is larger. More specifically, the target flow calculation section 63b calculates the target air flow based on the target power generation amount and the target oxygen utilization ratio. The oxygen utilization ratio correction section 64b applies the advancement/delay compensation filter as shown in FIG. 15A to the target air flow calculated by the target air calculation section 63, changes the parameters for the advancement/delay compensation filter, and corrects the oxygen utilization ratio. As shown in FIG. 15B, the air flow at the stationary time can be increased by setting a stationary compensation amount (b/d) large.

Further, as shown in FIG. 15B, by adjusting a delay compensation parameter (c) for the advancement/delay compensation filter, time until the air flow is stabilized to a stationary value after the air flow at the transient time is increased by an advancement function can be adjusted, and the air flow can be stabilized to the stationary value by taking a long time, so that a state of a low oxygen utilization ratio can be set long. When a transient load variation frequency is high, the air flow can be stabilized to the stationary value by taking a long time and the state of the low oxygen utilization ratio can be set long, so that the voltage drop at the transient time can be reduced.

As stated above, according to the second embodiment of the present invention, the oxygen concentration transient reduction section 43 transiently creates the low oxygen concentration state. The voltage variation detection section 44 measures the voltage variation while the oxygen concentration is low. The voltage stabilization maintenance determination section 45 determines whether the present oxygen utilization ratio is appropriate to maintain the fuel cell voltage stable before the voltage becomes unstable. When the low oxygen concentration state is created, the voltage drop of the cell having an unsatisfactory oxygen distribution is amplified. Therefore, by measuring the voltage variation in the low oxygen concentration state, a potential factor for making the voltage unstable can be determined beforehand.

The oxygen concentration transient reduction section 43 can extract the load from the fuel cell stack 34 by the response faster than the response of supplying the air arrives from the air supply device 31 to the cathode electrode of the fuel cell stack 34, and transiently create the low oxygen concentration state.

The voltage variation detection section 44 can measure the voltage variation from the difference between the lowest voltage at the time the load is transiently extracted and the voltage before the load is extracted. Based on this voltage variation, it is possible to determine whether the transient air flow is appropriate.

The voltage variation detection section 44 can detect the irregularity of each cell voltage right after the load is transiently extracted and the voltage falls down to the lowest voltage. Based on this voltage irregularity, it is possible to determine whether the stationary air flow is appropriate.

The transient-time correction section 61 reduces only the oxygen utilization ratio at the transient time, whereby it is possible to prevent shortage of the oxygen at the transient time and prevent the generated voltage from being equal to or lower than the lower limit. When the oxygen utilization ratio at the transient time is to be satisfied, the oxygen is often excessive at the stationary time since the voltage drop is large at the transient time. However, by allowing the transient-time correction section 61 to reduce only the oxygen utilization ratio at the transient time, it is possible to avoid such waste of oxygen and to improve fuel consumption.

Further, by allowing the stationary-time correction section 62 to reduce only the oxygen utilization ratio at the stationary time, it is possible to prevent shortage of oxygen and stabilize the generated voltage. If the oxygen utilization ratio at the stationary time is to be satisfied, the fuel consumption can be improved. However, the shortage of oxygen often occurs at the transient time. By allowing the stationary-time correction section 62 to reduce only the oxygen utilization ratio at the stationary time, such a defect can be avoided.

When the output of the voltage variation detection section 44 exceeds the predetermined limit, the erroneous detection prevention section 60 increases the oxidizing gas flow or increases the voltage difference between the inlet and outlet of the cathode electrode, thereby accelerating the flow velocity of the oxidizing gas within the cathode electrode, blowing off the water remaining in the cathode electrode, and discharging the water to the outside. By doing so, the water remaining in the cathode electrode can be blown off and discharged to the outside. After eliminating the voltage variation resulting from the water remaining in the cathode electrode, the low oxygen concentration state is created. The voltage variation can be thereby detected and erroneous detection can be prevented.

Each of the oxygen utilization ratio correction sections 64a and 64b changes the parameters for the advancement/delay compensation filter and corrects the oxygen utilization ratio, whereby it is possible to reduce only the oxygen utilization ratio at the transient time or the stationary time. By applying the advancement/delay compensation filter to the target air flow, and adjusting the advancement compensation, it is possible to increase only the air flow at the transient time without changing the air flow at the stationary time. Likewise, by adjusting the stationary compensation, it is possible to increase only the air flow at the stationary time without changing the air flow at the transient time.

Furthermore, by adjusting the delay compensation of the advancement/delay compensation filter, it is possible to adjust the time required until the air flow is stabilized to the stationary value after the air flow at the transient time is increased by the advancement function, stabilize the air flow to the stationary value by taking a long time, and set the state of the low oxygen utilization ratio long. Alternatively, the air flow can be stabilized to the stationary value by taking a short time, and the state of the low oxygen utilization ratio can be set short. If the transient load variation frequency is high, then the air flow can be stabilized by taking a long time, the state of the low oxygen utilization ratio can be set long, and the voltage drop at the transient time can be reduced.

As can be understood, the second embodiment can provide the fuel cell system capable of quickly detecting whether the generated voltage is made unstable if the air stoichiometric ratio is reduced to near the limit.

(Modification of the Second Embodiment)

A modification of the operations of the fuel cell system according to the second embodiment shown in FIG. 11 will be described with reference to FIGS. 16 to 18B and 21. The fuel cell system according to this modification differs from that shown in FIG. 11 in the configuration of the voltage variation detection section 44 as shown in FIG. 19. The other constituent elements of the fuel cell system according to this modification are equal to those shown in FIG. 11.

Figure 21:
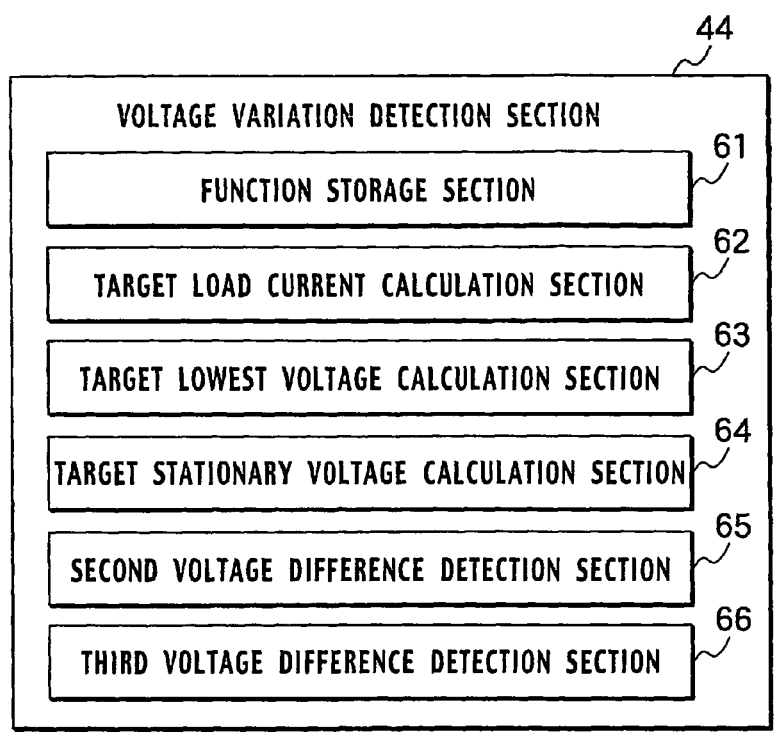
FIG. 21 is a block diagram showing another example of the voltage variation detection section shown in FIG. 11.

As shown in FIG. 21, the voltage variation detection section 44 includes a function storage section 61 which stores a current-to-voltage characteristic function of the fuel cell stack 34 with the oxygen utilization ratio used as a parameter, a target load current calculation section 62 which calculates a target load current from required power, a target lowest voltage calculation section 63 which inputs the target load current to the current-to-voltage characteristic function, and which calculates a target lowest voltage, a second voltage difference detection section 65 which detects a difference between the target lowest voltage and the lowest voltage, a target stationary voltage calculation section 64 which inputs the target load current to the current-to-voltage characteristic function, and which calculates a target stationary voltage, and a third voltage difference detection section 66 which detects a difference between the target stationary voltage and a stationary voltage right after the stationary voltage falls down to the lowest voltage.

Figure 12:
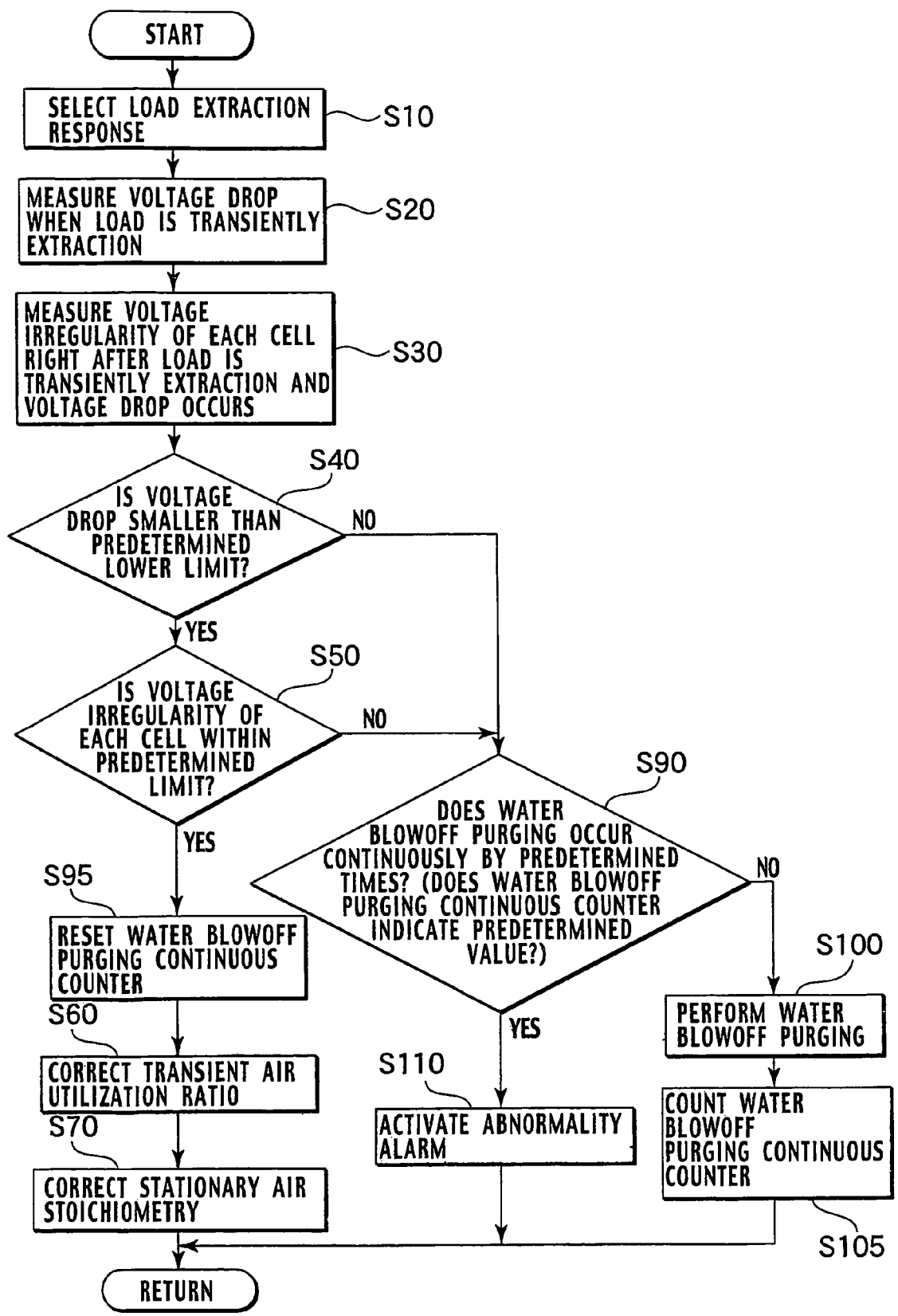
FIG. 12 is a flowchart showing one example of concrete operations of the fuel cell system shown in FIG. 11.

(a) At a stage S10, the response of the load extracted from the fuel cell track 34 is selected similarly to FIG. 12.

Figure 17A:
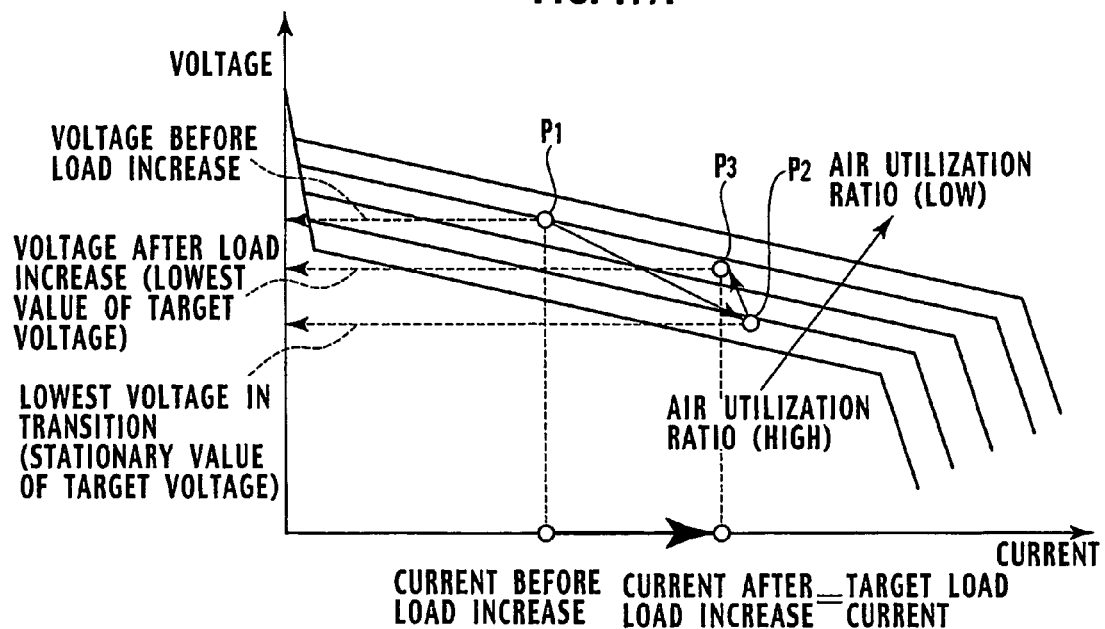
FIG. 17A is a graph showing a current-to-voltage characteristic function (I-V characteristic function) with an oxygen utilization ratio used as a parameter.
Figure 17B:
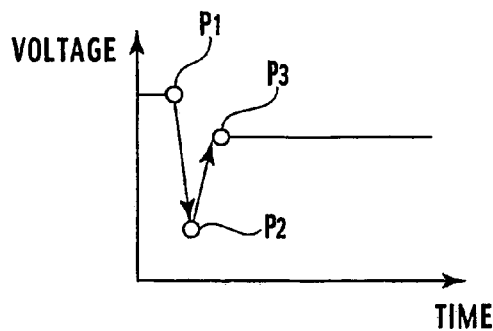
FIG. 17B is a graph showing a voltage locus (time response) by a transient load.

(b) At a stage SS15, the target low voltage and the target stationary voltage are set. Specifically, the function storage section 61 prepares the current-to-voltage characteristic function (I-V characteristic function) of the fuel cell stack 34 with the oxygen utilization ratio used as a parameter as shown in FIG. 17A. The target load current calculation section 62 calculates the target load current from the required power. The target lowest voltage calculation section 63 and the target stationary voltage calculation section 64 input the target load current to the current-to-voltage characteristic function of the fuel cell stack 34 show in FIG. 17A with the oxygen utilization ratio used as a parameter, and calculate the target lowest voltage and the target stationary voltage, respectively. It is noted that the required power is calculated from a throttle opening. In this modification, a function that associates the required power obtained by an experiment in advance with the throttle opening is created and referred to. In FIG. 17A, symbols $P_1$, $P_2$, and $P_3$ correspond to symbols $P_1$, $P_2$, and $P_3$ shown in FIG. 17B, respectively. FIG. 17B shows a voltage locus (time response) by the transient load. The target load current is calculated based on Equation (3).

$$\text{(Target load current)} = \text{(Required power [W])} \div \text{(Present fuel cell voltage)} \quad (3)$$

(c) At a stage SS20, the lowest voltage when the load is transiently extracted is measured. The second voltage difference detection section 65 compares the voltage when the load is transiently extracted and the voltage falls down to the lowest voltage with the target lowest voltage obtained at the stage SS15, and detects a lowest voltage difference. At a stage SS30, the voltage right after the load is transiently extracted and the voltage falls down to the lowest voltage is measured. In addition, the third voltage difference detection section 66 compares the measured voltage with the target stationary voltage obtained at the stage SS15, and detects a stationary voltage difference.

(d) At a stage SS40, it is determined whether the lowest voltage difference measured at the stage SS20 is below a lowest limit. When the lowest voltage difference is below the lowest limit ("NO" at the stage SS40), the processing goes to a stage S90. At a stage S50, it is determined whether the stationary voltage difference measured at the stage SS30 is below a predetermined limit. When the lowest voltage difference is below the lowest limit ("NO" at the stage SS50), the processing goes to the stage S90.

(e) At the stage S90, it is determined the water blowoff purging is continuously executed a predetermined number of times. When the voltage does not recover even after the water blowoff purging is continuously executed the predetermined number of times ("YES" at the stage S90), it is determined that an abnormality occurs and the processing goes to a stage S110, at which "an abnormality alarm" is issued. When the water blowoff purging is not continuously executed the predetermined number of times ("NO" at the stage S90), the processing goes to a stage S100, at which the water blowoff purging for blowing off the water remaining in the air channel of each fuel cell is continuously performed. Next, at a stage S105, a variable indicating whether the water blowoff purging is continued the predetermined times is counted up. The resetting of the counter is executed at a stage S95 similarly to FIG. 12.

Figure 18A:
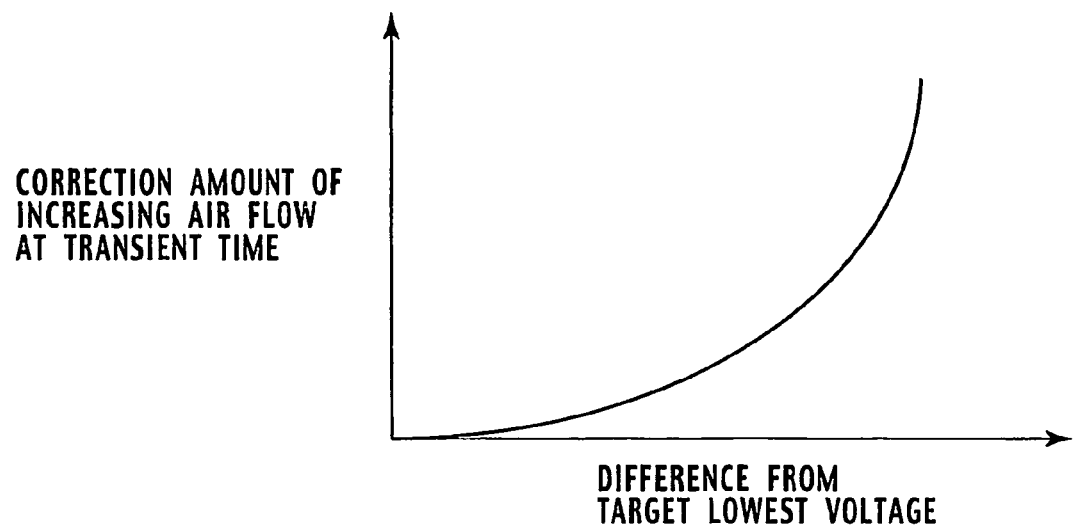
FIG. 18A is a graph showing a relationship between a difference between a target lowest voltage and a lowest voltage and the correction amount for increasing the air flow at the transient time.
Figure 18B:
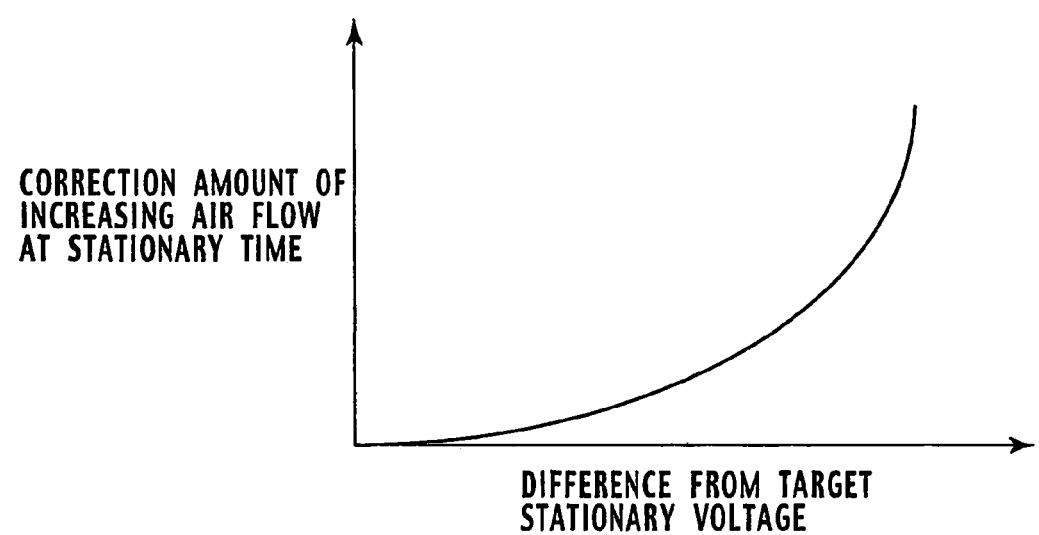
FIG. 18B is a graph showing a relationship between a difference between a target stationary voltage and a stationary voltage and the correction amount for increasing the air flow at stationary time.

(f) At a stage SS60, the air flow at the transient time is corrected to be increased in accordance with the lowest voltage difference measured at the stage SS20. As shown in FIG. 18A, as the difference between the lowest voltage and the target lowest voltage is larger, the air flow at the transient time is larger. At a stage SS70, the air flow at the stationary time is corrected to be increased in accordance with the stationary voltage difference measured at the stage SS30. As shown in FIG. 18B, as the difference between the stationary voltage and the target stationary voltage is larger, the air flow at the stationary time is larger.

As stated above, the target load current is input to the current-to-voltage characteristic function of the fuel cell stack 34 with the oxygen utilization ratio used as the parameter, the target lowest voltage is calculated, and the difference between the target lowest voltage and the lowest voltage is detected. By doing SO, it is possible to detect a voltage variation between the lowest voltage at the transient time that is a desired and ideal voltage and the lowest voltage of the fuel cell stack 34 at the present transient time. Based on this voltage variation, it is possible to determine whether the transient air flow is appropriate. In addition, it is possible to discriminate whether the voltage variation is a voltage variation due to a factor that an air utilization ratio is high or a voltage variation due to the other factor.

Moreover, the target load current is input to the current-to-voltage characteristic function of the fuel cell stack 34 with the oxygen utilization ratio used as the parameter, the target stationary voltage is calculated, and the difference between the target stationary voltage and the stationary voltage is detected. By doing so, it is possible to detect a voltage variation between a desired and ideal voltage (stationary voltage) and the present stationary voltage of the fuel cell stack 34. Based on this voltage variation, it is possible to determine whether the stationary air flow is appropriate. In addition, it is possible to discriminate whether the voltage variation is a voltage variation due to a factor that the air utilization ratio is high or a voltage variation due to the other factor.

The entire contents of a Patent Application No. TOKUGAN 2003-279731 with a filing date of Jul. 25, 2003 and a Patent Application No. TOKUGAN 2003-324491 with a filing date of Sep. 17, 2003 in Japan are hereby incorporated by reference.

As explained above, the present invention has been described by the first and the second embodiments, as well as the modification thereof. However, it should not be understood that the descriptions and the diagrams constituting a part of the disclosure limit the present invention. Various alternative embodiments, examples, and operational techniques will be apparent to those skilled in the art from the present disclosure. That is, the present invention includes those alternative embodiments and the like, which are not disclosed herein. The present invention is therefore limited only by features of the invention according to the scope of the following claims pertinent to the disclosure.

The invention claimed is:

1. A device, for controlling a fuel cell system, the fuel cell system comprising: a fuel cell which generates power using a fuel gas and an oxidizing agent gas serving as materials of the-fuel cell system; and a material supply section which supplies the materials to the fuel cell, the power generated by the fuel cell being extracted to a load, the device comprising:

a material flow calculation section configured to calculate a material flow supplied to the fuel cell so as to cause the fuel cell to generate the power of a required power generation amount;

a vibration amplitude detection section configured to detect a vibration amplitude of a generated current or a vibration amplitude of a generated voltage, wherein the material flow calculation section makes any of the following operations when the vibration amplitude is higher than or equal to a first predetermined value:
maintaining the material flow, and
increasing the material flow;

a material reduction limit detection section configured to calculate a limit for reducing the material flow supplied to the fuel cell, when the vibration amplitude is lower than the first predetermined value; and a material flow change section configured to control the, material supply section so as to change the material flow calculated by the material flow calculation section to the limit calculated by the material reduction limit detection section.

2. The device of claim 1, wherein the material reduction limit detection section calculates the limit based on a change in a generated current or a change in a generated voltage extracted from the fuel cell to the load.

3. The device of claim 1, wherein the material flow change section controls the load to extract target power from the fuel cell, and controls the material supply section to increase or reduce the material flow within a range equal to or higher than the limit in accordance with arise or a fall of the generated current or the generated voltage extracted to the load.

4. The device of claim 3, wherein the material reduction limit detection section calculates a margin ratio indicating a degree of increasing the limit, based on the vibration amplitude of the generated current or the vibration amplitude of the generated voltage, and based on operating state of the fuel cell.

5. The device of claim 4, wherein, the material reduction limit detection section performs one of a processing for setting the margin ratio higher as the vibration amplitude of the generated current or the vibration amplitude of the generated voltage is higher, a processing for setting the margin ratio higher as an operating temperature of the fuel cell is lower, a processing for setting the margin ratio higher as an irregularity of a voltage of each cell unit that constitutes the fuel cell is larger, and a processing for setting the margin ratio higher as the fuel cell is, less humidified.

6. The device of claim 1, wherein the material flow change section calculates the material flow to be increased or reduced and changes the material flow based on a ratio of a change amount of the, generated voltage to a change amount of the material flow according to a generated voltage applied from the fuel cell to the load when the material flow is to be changed based on the limit.

7. The device of claim 6, wherein the material flow change section changes the material flow using a function for obtaining the ratio of the change amount of the generated voltage to the change amount of the material flow according to the generated voltage applied from the fuel cell to the load.

8. The device of claim 1, wherein when an oxidizing agent gas flow discharged from the fuel cell is, made smaller than a predetermined value or a concentration of oxygen contained in the discharged oxidizing agent gas is, made lower than a predetermined value by reducing the material flow, the material reduction limit detection section sets the reduced material flow as the limit.

9. The device of claim 1, wherein the material flow change section increases or reduces the material flow so that a vibration amplitude of a generated current or a vibration amplitude of a generated voltage extracted from the fuel cell falls within a predetermined range, and increases or reduces the material flow so that an oxidizing agent gas flow discharged from the fuel cell falls within a predetermined range or so that a concentration of oxygen contained in the discharged oxidizing agent gas falls within a predetermined range.

10. The device of claim 1, wherein the first predetermined value determines whether the material flow can be reduced while not generating the vibration of the generated current.

11. The device of claim 1, wherein:
a second predetermined value is set in advance for determining whether the fuel cell does not stably generate the power due to the material flow being smaller,
when the vibration amplitude is higher than or equal to the first predetermined value and is lower than the second predetermined value, the material flow calculation section maintains the material flow, and
when the vibration amplitude is higher than or equal to the first predetermined value and is higher than or equal to the second predetermined value, the material flow calculation section increases the material flow.

12. A method for controlling a fuel cell system, the fuel cell system comprising: a fuel cell which generates power using a fuel gas and an oxidizing agent gas serving as materials of the fuel cell system; and a material supply section which supplies the materials to the fuel cell, the power generated by the fuel cell being extracted to a load, the method comprising:
calculating a material flow supplied to the fuel cell so as to cause the fuel cell to generate the power of a required power generation amount;
detecting a vibration amplitude of a generated current or a vibration amplitude of a generated voltage, wherein the step of calculating the material flow makes any of the following operations when the vibration amplitude is higher than or equal to a first predetermined value:
maintaining the material flow, and
increasing the material flow;
calculating a limit for reducing the material flow supplied to the fuel cell, when the vibration amplitude is lower than the first predetermined value; and
controlling the material supply section so as change the material flow to the limit.

13. The method of claim 12, wherein the first predetermined value determines whether the material flow can be reduced while not generating the vibration of the generated current.

14. The method of claim 12, wherein:
a second predetermined value is set in advance for determining whether the fuel cell does not stably generate the power due to the material flow being smaller,
when the vibration amplitude is higher than or equal to the first predetermined value and is lower than the second predetermined value, the material flow is maintained in the step of calculating the material flow, and
when the vibration amplitude is higher than or equal to the first predetermined value and is higher than or equal to the predetermined value the material flow is increased in the step of calculating the material flow.

15. The method of claim 12, wherein the limit for reducing the material flow, is set by the following operations:
setting the power generation amount required for the load,
setting a reduction width of the material flow so as to have a preset amplitude, so that the vibration amplitude of the generated current or the vibration amplitude of the generated voltage has a predetermined value, and
setting the predetermined value as the limit for reducing the material flow.

16. The method of claim 12, wherein the limit for reducing the material flow is set by the following operations:
setting a reduction width of the material flow based on required load current,
setting the seduction width of the material flow so as to have a preset amplitude, so that the vibration amplitude of the generated voltage has a predetermined value, and
setting the predetermined value as the limit for reducing the material flow.

* * * * *